United States Patent
Joshi et al.

(10) Patent No.: US 9,467,865 B2
(45) Date of Patent: Oct. 11, 2016

(54) AVOIDANCE OF INTERFERENCE DURING SIMULTANEOUS MULTI-ACTIVE TECHNOLOGIES IN GLOBAL MODE

(71) Applicant: QUALCOMM Incorporated, San Diego, CA (US)

(72) Inventors: Rohit Joshi, Uttarakhand (IN); Bhaskara Viswanadham Batchu, Hyderabad (IN); Ejazahmed Yergudi, Haliyal (IN); Gadigeppa Malagund, San Diego, CA (US); Shivank Nayak, San Diego, CA (US); Qin Frantti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 14/279,409

(22) Filed: May 16, 2014

(65) Prior Publication Data
US 2015/0334575 A1    Nov. 19, 2015

(51) Int. Cl.
*H04W 16/14* (2009.01)
*H04W 72/04* (2009.01)
(Continued)

(52) U.S. Cl.
CPC ............ *H04W 16/14* (2013.01); *H04J 11/005* (2013.01); *H04L 1/00* (2013.01); *H04W 72/0453* (2013.01); *H04W 48/18* (2013.01); *H04W 60/005* (2013.01); *H04W 76/026* (2013.01); *H04W 88/06* (2013.01)

(58) Field of Classification Search
None
See application file for complete search history.

(56) References Cited

U.S. PATENT DOCUMENTS 8,340,580 B1  12/2012  Epstein
8,526,388 B1   9/2013  Kaukovuori et al.
(Continued)

FOREIGN PATENT DOCUMENTS

WO    WO2014/058361    *    4/2014

OTHER PUBLICATIONS

3rd Generation Partnership Project, Technical Specification Group Radio Access Network, Evolved Universal Terrestrial Radio Access (E-UTRA), Study on signalling and procedure for interference avoidance for in-device coexistence (Release 11), 3GPP Standard, 3GPP TR 36.816, Mobile Competence Centre, 650, Route Des Lucioles, F-06921 Sophia-Antipolis Cedex, vol. RAN WG2, No. V11.2.0, Dec. 22, 2011, pp. 1-44, XP050555147.
(Continued)

*Primary Examiner* — Hassan Kizou
*Assistant Examiner* — Tejis Daya
(74) *Attorney, Agent, or Firm* — The Marbury Law Group, PLLC

(57) ABSTRACT

Various embodiments implemented on a mobile communication device leverage the availability of multiple RATs to receive service from a combination of RATs that avoids the potential for inter-RAT coexistence interference. A mobile communication device processor may determine whether there is a likelihood of inter-RAT coexistence interference between a first RAT and a second RAT. In response to determining that there is a likelihood of interference occurring between the first RAT and the second RAT, the device processor may attempt to receive service with the first RAT and a third RAT that will not interfere with the first RAT. The device processor may monitor conditions to recognize when the likelihood of interference no longer exists between the first RAT and the second RAT, and reestablish service with the second RAT when that happens. Thus, the device processor may ensure that service is only acquired with non-interfering RATs.

30 Claims, 15 Drawing Sheets

(51) Int. Cl.
*H04J 11/00* (2006.01)
*H04L 1/00* (2006.01)
*H04W 48/18* (2009.01)
*H04W 60/00* (2009.01)
*H04W 76/02* (2009.01)
*H04W 88/06* (2009.01)

(56) References Cited

U.S. PATENT DOCUMENTS

| | | | | |
|---|---|---|---|---|
| 2002/0136183 | A1* | 9/2002 | Chen | H04W 72/1215 370/338 |
| 2003/0125073 | A1* | 7/2003 | Tsai | H04W 68/02 455/552.1 |
| 2004/0028011 | A1* | 2/2004 | Gehring | H04B 1/719 370/330 |
| 2005/0202823 | A1* | 9/2005 | Shaheen | H04W 36/0061 455/436 |
| 2008/0293394 | A1 | 11/2008 | Silver et al. | |
| 2009/0180451 | A1* | 7/2009 | Alpert | H04W 72/1215 370/338 |
| 2010/0075665 | A1* | 3/2010 | Nader | H04J 11/0093 455/426.1 |
| 2010/0105425 | A1* | 4/2010 | Asokan | H04B 1/406 455/552.1 |
| 2010/0304685 | A1 | 12/2010 | Wietfeldt et al. | |
| 2011/0292821 | A1* | 12/2011 | Chin | H04W 36/0066 370/252 |
| 2012/0082070 | A1 | 4/2012 | Hart et al. | |
| 2012/0207040 | A1 | 8/2012 | Comsa et al. | |
| 2012/0213162 | A1* | 8/2012 | Koo | H04W 16/14 370/329 |
| 2013/0028119 | A1* | 1/2013 | Ben-Eli | H04W 48/16 370/252 |
| 2013/0028199 | A1 | 1/2013 | Song et al. | |
| 2013/0029704 | A1 | 1/2013 | Koo et al. | |
| 2013/0064176 | A1 | 3/2013 | Hsu et al. | |
| 2013/0176885 | A1 | 7/2013 | Lee et al. | |
| 2013/0244660 | A1* | 9/2013 | Kumar | H04W 36/165 455/436 |
| 2013/0252608 | A1* | 9/2013 | Lee | H04W 88/06 455/434 |
| 2013/0303235 | A1 | 11/2013 | Zheng et al. | |
| 2013/0308481 | A1* | 11/2013 | Kazmi | H04W 24/02 370/252 |
| 2013/0329639 | A1 | 12/2013 | Wietfeldt et al. | |
| 2014/0031031 | A1 | 1/2014 | Gauvreau et al. | |
| 2014/0038587 | A1* | 2/2014 | Murgan | H04W 48/16 455/422.1 |
| 2014/0050146 | A1 | 2/2014 | Chrisikos et al. | |
| 2014/0087785 | A1* | 3/2014 | Smadi | H04J 11/0023 455/552.1 |
| 2014/0146732 | A1* | 5/2014 | Olufunmilola | H04W 24/10 370/311 |
| 2014/0221028 | A1* | 8/2014 | Desai | H04B 15/00 455/501 |
| 2015/0049705 | A1* | 2/2015 | Feuersaenger | H04W 72/1215 370/329 |
| 2015/0181437 | A1* | 6/2015 | Choudhary | H04W 16/14 455/509 |
| 2015/0237645 | A1* | 8/2015 | Andrianov | H04W 72/1215 370/329 |
| 2015/0327125 | A1* | 11/2015 | Lindoff | H04W 48/18 455/437 |

OTHER PUBLICATIONS

International Search Report and Written Opinion—PCT/US2015/025988—ISA/EPO—Jul. 10, 2015.

* cited by examiner

| RADIO ACCESS TECHNOLOGY | CURRENTLY AVAILABLE BANDS |
|---|---|
| RAT 1 | A (preferred) |
|  | B |
| RAT 2 | Q |
|  | R (preferred) |
| RAT 3 | X (preferred) |
|  | Y |

| Frequency Band | Interfering Bands |
|---|---|
| A | Q, R, X |
| B | Q, R, Y |
| Q | A, B |
| R | A, B, Y |
| X | A |
| Y | Q, R |

AVOIDANCE OF INTERFERENCE DURING SIMULTANEOUS MULTI-ACTIVE TECHNOLOGIES IN GLOBAL MODE

RELATED APPLICATIONS

This application is related to U.S. patent application Ser. No. 14/279,403 entitled "Preventing Coexistence Interference Through Smart Band Selection in MSMA Devices," which is filed contemporaneously with this application and is hereby incorporated by reference in its entirety.

BACKGROUND

Some new designs of mobile communication devices—such as smart phones, tablet computers, and laptop computers—include two or more radio access technologies ("RATs") that enable the devices to connect to two or more radio access networks. Examples of radio access networks include GSM, TD-SCDMA, CDMA2000, and WCDMA. Such mobile communication devices (sometimes referred to as "multi-active communication devices") may also include two or more radio-frequency (RF) communication circuits or "RF resources" to provide users with access to separate networks via the two or more RATs.

Multi-active communication devices may include mobile communication devices (i.e., multi-Subscriber-Identity-Module (SIM), multi-active or "MSMA" communication devices) with a plurality of SIM cards that are each associated with a different RAT and utilize a different RF resource to connect to a separate mobile telephony network. An example multi-active communication device is a "dual-SIM-dual-active" or "DSDA" communication device, which includes two SIM cards/subscriptions associated with two mobile telephony networks. Further, some newer multi-active communication devices may include one or more SIMs/subscriptions capable of using multiple RATs (sometimes referred to as "global mode" subscriptions) simultaneously or at different times. For example, a global mode subscription may be included on a single-SIM communication device, such as a simultaneous GSM-LTE ("SGLTE") communication device, which includes one SIM card/subscription associated with two RATs that each use an RF resource to connect to two separate mobile networks simultaneously on behalf of the one subscription.

When a mobile communication device includes a plurality of RATs, each RAT on the device may utilize a different RF resource to communicate with its associated network at any time. For example, a first RAT (e.g., a GSM RAT) may use a first transceiver to transmit to a GSM base station at the same time a second RAT (e.g., a WCDMA RAT) uses a second transceiver to transmit to a WCDMA base station. However, because of the proximity of the antennas of the RF resources included in a multi-active communication device, the simultaneous use of the RF resources may cause one or more RF resources to desensitize or interfere with the ability of the other RF resources to operate normally.

Generally, receiver desensitization (referred to as "de-sense"), or degradation of receiver sensitivity, may result from noise interference of a nearby transmitter. For example, when two radios are close together with one transmitting on the uplink—the aggressor communication activity ("aggressor")—and the other receiving on the downlink—the victim communication activity ("victim")—signals from the aggressor's transmitter may be picked up by the victim's receiver or otherwise interfere with reception of a weaker signal (e.g., from a distant base station). As a result, the received signals may become corrupted and difficult or impossible for the victim to decode. Receiver de-sense presents a design and operational challenge for multi-radio devices, such as multi-active communication devices, due to the necessary proximity of transmitters in these devices.

SUMMARY

Various embodiments provide methods, devices, and non-transitory processor-readable storage media for avoiding coexistence interference between radio access technologies (RATs) operating on a mobile communication device.

Some embodiment methods may include determining whether there is a likelihood of coexistence interference occurring between a first RAT and a second RAT, acquiring service with the first RAT and the second RAT in response to determining that there is not a likelihood of coexistence interference occurring between the first RAT and the second RAT, and acquiring service with the first RAT and a third RAT that will not interfere with the first RAT in response to determining that there is a likelihood of coexistence interference occurring between the first RAT and the second RAT.

In some embodiments, the first RAT may have a highest priority of a plurality of RATs on the mobile communication device, and the second RAT may have a next highest priority of the plurality of RATs.

In some embodiments, determining whether there is a likelihood of coexistence interference occurring between a first RAT and a second RAT may include determining whether there is a combination of frequency bands for the first RAT and the second RAT that will avoid coexistence interference between the first RAT and the second RAT, and acquiring service with the first RAT and the second RAT in response to determining that there is not a likelihood of coexistence interference occurring between the first RAT and the second RAT may include acquiring service with the first RAT and the second RAT based on the combination of frequency bands in response to determining that the combination of frequency bands will avoid coexistence interference between the first RAT and the second RAT.

In some embodiments, the methods may include monitoring the first RAT and the second RAT for frequency band changes in response to acquiring service with the first RAT and the second RAT, determining whether coexistence-interference conditions between the first RAT and the second RAT have changed, and determining whether there is now a likelihood of coexistence interference occurring between the first RAT and the second RAT in response to determining that coexistence-interference conditions between the first RAT and the second RAT have changed.

In some embodiments, determining whether there is a likelihood of coexistence interference occurring between a first RAT and a second RAT may include performing a lookup in an interference data table for frequency bands available to the first RAT and frequency bands available to the second RAT and determining whether there is a likelihood of coexistence interference occurring between the first RAT and the second RAT based on the table lookup.

In some embodiments, the methods may include determining whether there is no longer a likelihood of coexistence interference occurring between the first RAT and the second RAT in response to acquiring service with the first RAT and the third RAT, and acquiring service with the first RAT and the second RAT in response to determining that there is no longer a likelihood of coexistence interference occurring between the first RAT and the second RAT.

In some embodiments, determining whether there is no longer a likelihood of coexistence interference occurring between the first RAT and the second RAT may include monitoring the first RAT for frequency band changes, performing background frequency band scans for the second RAT to determine whether new frequency bands are available to the second RAT, determining whether coexistence-interference conditions between the first RAT and the second RAT have changed, and determining whether there is no longer a likelihood of coexistence interference occurring between the first RAT and the second RAT in response to determining that coexistence-interference conditions between the first RAT and the second RAT have changed.

In some embodiments, acquiring service with the first RAT and a third RAT that will not interfere with the first RAT may include identifying a first group of RATs that provide services similar to services of the second RAT, determining whether there is a RAT within the first group of RATs for which there is not a likelihood of interfering with the first RAT, selecting a RAT in the first group of RATs that has a highest priority within the first group of RATs and that will not interfere with the first RAT in response to determining that there is a RAT within the first group of RATs for which there is not a likelihood of interfering with the first RAT, and acquiring service with the first RAT and the selected RAT.

In some embodiments, the methods may include acquiring service with the first RAT and the second RAT and implementing coexistence interference mitigation strategies for the first RAT and the second RAT in response to determining that there is no RAT within the first group of RATs for which there is not a likelihood of interfering with the first RAT.

In some embodiments, the methods may include identifying a second group of RATs that provide services similar to services of the first RAT in response to determining that there is no RAT within the first group of RATs for which there is not a likelihood of interfering with the first RAT, determining whether there is a RAT within the second group of RATs for which there is not a likelihood of interfering with the second RAT, selecting a RAT in the second group of RATs that has a highest priority within the second group of RATs and that will not interfere with the second RAT in response to determining that there is a RAT within the second group of RATs for which there is not a likelihood of interfering with the second RAT, and acquiring service with the second RAT and the selected RAT.

In some embodiments, the methods may include acquiring service with the first RAT and the second RAT and implementing coexistence interference mitigation strategies for the first RAT and the second RAT in response to determining that there is no RAT within the second group of RATs for which there is not a likelihood of interfering with the second RAT.

In some embodiments, the methods may include identifying a second group of RATs that provide services similar to services of the first RAT in response to determining that there is no RAT within the first group of RATs for which there is not a likelihood of interfering with the first RAT, selecting a RAT in the second group of RATs that has a highest priority within the second group of RATs, determining whether there is a likelihood that the selected RAT will interfere with the second RAT, acquiring service with the second RAT and the selected RAT in response to determining that there is not a likelihood that the selected RAT will interfere with the second RAT.

In some embodiments, the methods may include determining whether there is a RAT in the second group of RATs that has not been selected in response to determining that there is a likelihood that the selected RAT will interfere with the second RAT and acquiring service with the first RAT and the second RAT, and implementing coexistence interference mitigation strategies for the first RAT and the second RAT in response to determining that each RAT in the second group of RATs has been selected and evaluated for interference potential. In some embodiments, the methods may include determining whether there is a RAT in the second group of RATs that has not been selected in response to determining that there is a likelihood that the selected RAT will interfere with the second RAT and acquiring service with the first RAT in a dual service dual standby (DSDS) operating mode.

In some embodiments, the methods may include selecting an unselected RAT in the second group of RATs that has a next highest priority in the second group of RATs in response to determining that there is a RAT in the second group of RATs that has not previously been selected, determining whether there is a likelihood that the selected RAT that has the next highest priority in the second group of RATs will interfere with the second RAT, and acquiring service with the second RAT and the selected RAT that has the next highest priority in the second group of RATs in response to determining that there is not a likelihood that the selected RAT with the next highest priority in the second group of RATs will interfere with the second RAT.

In some embodiments, determining whether there is a likelihood of coexistence interference occurring between a first RAT and a second RAT may include identifying a preferred frequency band of the first RAT and a preferred frequency band of the second RAT and determining whether there is a likelihood that the preferred frequency band of the first RAT and the preferred frequency band of the second RAT will interfere, and acquiring service with the first RAT and the second RAT may include acquiring service with the first RAT via the preferred frequency band of the first RAT and with the second RAT via the preferred frequency band of the second RAT in response to determining that there is not a likelihood that the preferred frequency band of the first RAT and the preferred frequency band of the second RAT will interfere.

In some embodiments, determining whether there is a likelihood that the preferred frequency band of the first RAT and the preferred frequency band of the second RAT will interfere may include performing a lookup operation in an interference data table for the preferred frequency band of the first RAT and the preferred frequency band of the second RAT, and determining whether there is a likelihood that the preferred frequency band of the first RAT and the preferred frequency band of the second RAT will interfere based on the table lookup.

In some embodiments, determining whether there is a likelihood of coexistence interference occurring between a first RAT and a second RAT may include determining whether there is a frequency band available to the second RAT that will not interfere with the preferred frequency band of the first RAT in response to determining that there is a likelihood that the preferred frequency band of the first RAT and the preferred frequency band of the second RAT will interfere, and acquiring service with the first RAT and the second RAT may include acquiring service with the first RAT via the preferred frequency band of the first RAT and with the second RAT via a frequency band available to the second RAT that will not interfere with the preferred frequency band of the first RAT in response to determining that there is a frequency band available to the second RAT that will not interfere with the preferred frequency band of the first RAT.

In some embodiments, determining whether there is a frequency band available to the second RAT that will not interfere with the preferred frequency band of the first RAT may include performing a lookup in an interference data table for the preferred frequency band for the first RAT and each frequency band available to the second RAT, and determining whether there is a frequency band available to the second RAT that will not interfere with the preferred frequency band of the first RAT based on the table lookup.

In some embodiments, acquiring service with the first RAT and a third RAT that will not interfere with the first RAT may include identifying a first group of RATs that provide services similar to services of the second RAT, selecting a RAT in the first group of RATs that has a highest priority within the first group of RATs, determining whether there is a likelihood that the selected RAT will interfere with the first RAT, and acquiring service with the first RAT and the selected RAT in response to determining that there is not a likelihood that the selected RAT will interfere with the first RAT.

In some embodiments, the methods may include determining whether there is a RAT in the first group of RATs that has not previously been selected in response to determining that there is a likelihood that the selected RAT will interfere with the first RAT and acquiring service with the first RAT and the second RAT and implementing coexistence interference mitigation strategies for the first RAT and the second RAT in response to determining that each RAT in the first group of RATs has been previously selected.

In some embodiments, the methods may include selecting an unselected RAT in the first group of RATs that has a next highest priority in the first group of RATs in response to determining that there is a RAT in the first group of RATs that has not previously been selected, determining whether there is a likelihood that the selected RAT that has the next highest priority in the first group of RATs will interfere with the first RAT, and acquiring service with the first RAT and the selected RAT that has the next highest priority in the first group of RATs in response to determining that there is not a likelihood that the selected RAT that has the next highest priority in the first group of RATs will interfere with the first RAT.

Various embodiments may include a mobile communication device configured with processor-executable instructions to perform operations of the methods described above.

Various embodiments may include a mobile communication device having means for performing functions of the operations of the methods described above.

Various embodiments may include non-transitory processor-readable media on which are stored processor-executable instructions configured to cause a processor of a mobile communication device to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
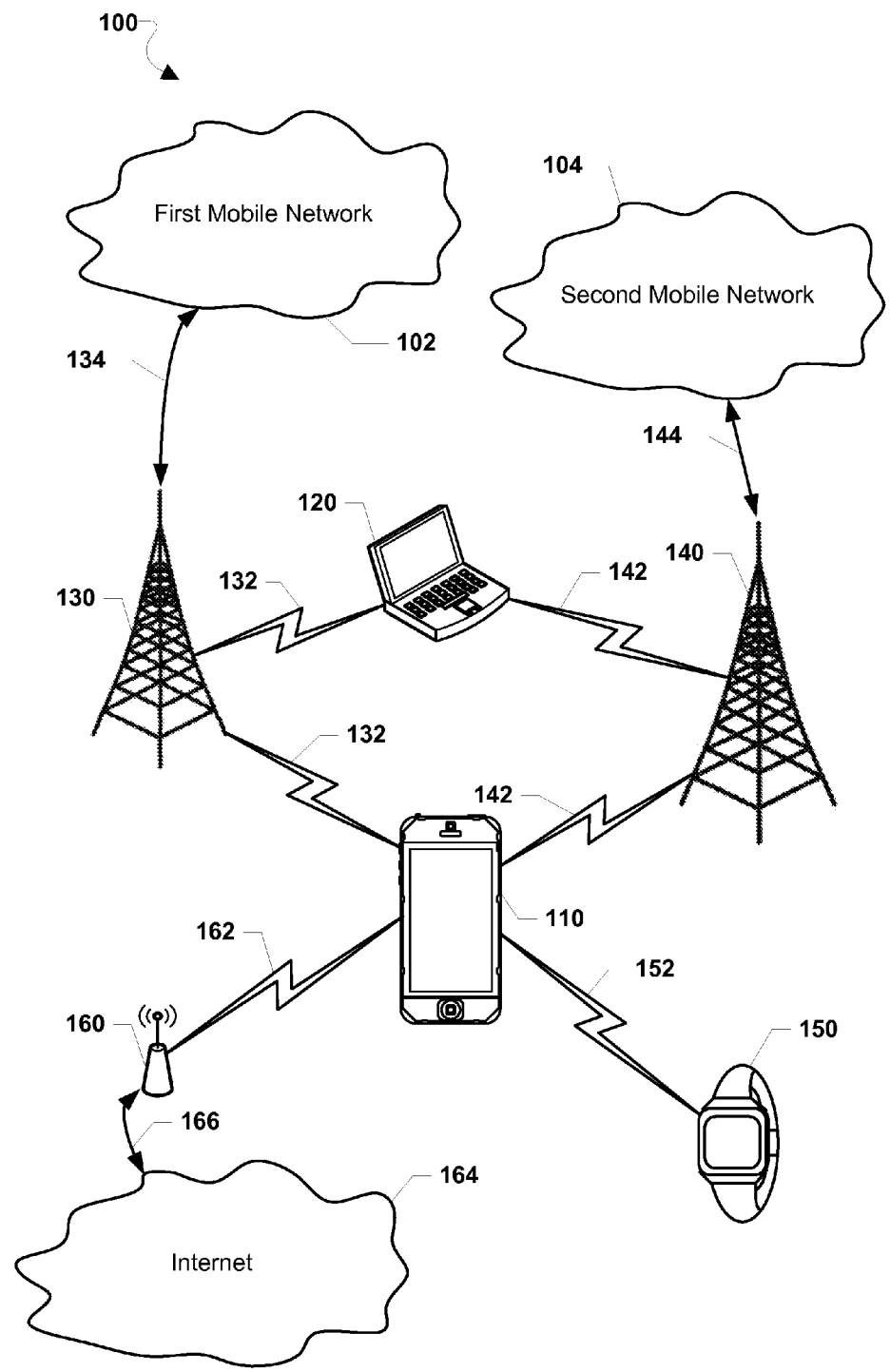
FIG. 1 is a communication system block diagram of mobile telephony networks suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "multi-active communication device" and "mobile communication device" are used interchangeably and refer to any one or all of cellular telephones, smart phones, personal or mobile multi-media players, personal data assistants, laptop computers, personal computers, tablet computers, smart books, palm-top computers, wireless electronic mail receivers, multimedia Internet-enabled cellular telephones, wireless gaming controllers, and similar personal electronic devices that include a programmable processor, memory, and circuitry for connecting to at least two mobile communication networks. The various aspects may be useful in mobile communication devices, such as smart phones, and so such devices are referred to in the descriptions of various embodiments. However, the embodiments may be useful in any electronic devices, such as a DSDA communication device, that may individually maintain a plurality of RATs that may simultaneously utilize a plurality of separate RF resources.

Multi-active communication devices have a plurality of RF resources capable of supporting a plurality of RATs capable of receiving and transmitting simultaneously. As described, one or more RATs on a multi-active communication device may negatively affect the performance of other RATs operating on the multi-active communication device. For example, a multi-active communication device may suffer from inter-RAT coexistence interference when an aggressor RAT is attempting to transmit while a victim RAT is simultaneously attempting to receive transmissions. During such a "coexistence event," the aggressor RAT's transmissions may cause severe impairment to the victim RAT's ability to receive transmissions. This interference may be in the form of blocking interference, harmonics, intermodulation, and other noises and distortion received by the victim. Such interference may significantly degrade the victim RAT's receiver sensitivity, voice call quality, and data throughput. These effects may also result in a reduced network capacity.

Currently, many solutions for mitigating victim RAT de-sense are implemented on conventional multi-active communication devices. For example, in some solutions, a multi-active communication device configures the aggressor RAT to reduce or zero its transmit power while the victim RAT is receiving transmissions. In other words, the device reduces the aggressor RAT's transmit power or, in some extreme cases, zeros the aggressor RAT's transmit power (sometimes referred to as implementing transmit ("Tx") blanking) in order to reduce or eliminate the victim RAT's de-sense. However, solutions such as implementing Tx blanking increases the error probability of subsequently received information from the network and decreases the aggressor RAT's overall throughput. Further, such solutions incur a cost on the link-level performance of the aggressor RAT and/or impact the aggressor RAT's reverse link throughput. While current solutions for utilizing Tx blanking are effective at reducing the victim RAT's de-sense, the improvement to the victim RAT's reception performance is often at the expense of the aggressor RAT's performance.

Currently, multiple frequency bands/channels may be available to a RAT at any given time, and some conventional solutions for reducing inter-RAT coexistence interference configure RATs operating on the same communication device to utilize operating frequency bands that avoid RAT de-sense. Specifically, in these solutions, the communication device informs a RAT's network in the event that transmission/reception of radio signals would benefit or no longer benefit from using certain carriers or frequency resources, for example, by signaling the network that certain frequency bands are not usable due to in-device coexistence. However, these solutions are ineffective in circumstances in which interfering RATs do not have a frequency-band/channel combination that avoids inter-RAT coexistence interference and, as a result, do nothing to prevent or avoid a victim RAT's de-sense.

In contrast to these conventional solutions, various embodiments avoid simultaneously utilizing two or more RATs on the same mobile communication device when there is a likelihood that one or more of those RATs would experience inter-RAT coexistence interference. Specifically, in response to determining that there is a risk of a coexistence event occurring between two or more RATs on a mobile communication device, the device may attempt to receive service with a combination of RATs that avoids inter-RAT coexistence interference.

In some other conventional solutions, multi-active communication devices perform RAT switching in response to determining that a RAT is currently being de-sensed by another RAT. However, such solutions achieve limited success because a RAT switch is implemented only after inter-RAT coexistence interference between two RATs has already started, thereby causing the victim RAT(s) to experience degraded services for some period of time before the switch and causing the multi-active communication device to temporarily lose service during the switch. Further, such conventional solutions do not describe mechanisms for returning to a previous, preferred combination/configuration of RATs after switching RATs, which may result in overall degraded or lower performance on the multi-active communication device. For example, such solutions do not described mechanisms to switch back to a higher priority RAT (e.g., an LTE RAT) after switching to a lower priority RAT (e.g., an evolution-data optimized or "EV-DO" RAT) to avoid temporary coexistence interference between the higher priority RAT and another RAT. As a result, these solutions may help to maintain the multi-active communication device in a non-preferred configuration.

In overview, various embodiments implemented on a mobile communication device (e.g., a multi-active communication device) leverage the availability of multiple RATs on the mobile communication device in order to receive service from a combination of RATs that avoids the potential for inter-RAT coexistence interference. Specifically, a processor on the mobile communication device may determine whether there is a likelihood of inter-RAT coexistence interference occurring between a first RAT and a second RAT, such as based on frequency bands/channels currently available to each of the first RAT and the second RAT that are known to interfere with each other. In response to determining that there is a likelihood of inter-RAT coexistence interference occurring between the first RAT and the second RAT, the device processor may attempt to receive service with the first RAT and a third RAT that will not interfere with the first RAT. In response to determining that there is no longer a likelihood of inter-RAT coexistence interference occurring between the first RAT and the second RAT, the device processor may attempt to receive service with the first RAT and the second RAT. Thus, by preemptively identifying RATs that are at risk of experiencing inter-RAT coexistence interference, the device processor may ensure that service is acquired only with non-interfering RATs. As a result, the mobile communication device may receive consistent, high-quality service because the RATs may avoid degraded performance due to inter-RAT coexistence interference.

In various embodiments, the device processor may determine and/or enforce a priority ranking for each of a plurality of RATs on the mobile communication device and may attempt to acquire service with a preferred combination of the highest priority RATs. For instance, the device processor may attempt to receive service via a first RAT with a highest priority and a second RAT with a next highest priority. Further, in some embodiments in which there is a likelihood of a coexistence event occurring between the first RAT and the second RAT, the device processor may attempt to acquire service with the first RAT and a third RAT that has the next highest priority following the second RAT and that will not interfere with the first RAT. The priority assigned to each RAT may be based on one or a combination of a number of factors, such as user preferences, service fee schedules, location, quality of service, data rates, etc.

In various embodiments, the device processor may determine that there is (or still is) a likelihood of a coexistence event occurring between the first RAT and the second RAT by performing a lookup of frequency bands available to each of the first and second RATs in an interference data table. In such embodiments, the interference data table may include information the device processor may use to identify whether there is a combination of frequency bands/channels for the first RAT and the second RAT that avoids potential inter-RAT coexistence interference. In response to determining that there is no combination of frequency bands/channels for the first and second RATs that avoids the possibility of inter-RAT coexistence interference, the device processor may attempt to acquire service with the first RAT and a third RAT that will not interfere with the first RAT, as described.

In various embodiments, while receiving service with a "non-preferred" combination of RATs that includes lower-priority RATs (e.g., the first RAT and the third RAT), the device processor may periodically attempt to "fall back" to a preferred RAT configuration of the first RAT and the second RAT because the first and second RATs may be the "preferred" or highest-priority RATs on the mobile communication device. For example, in some embodiments, upon acquiring service with the first RAT and a third RAT, the device processor may continually or periodically monitor the first RAT's operations to determine whether the first RAT has moved to another frequency band/channel, such as when the first RAT undergoes a handover to a new cell. The device processor may also or alternatively determine whether new frequency bands/channels are available to the second RAT, such as by periodically performing background frequency band scans to identify frequency bands/channels that are currently available to the second RAT. In response to determining that the first RAT has moved to another frequency band/channel and/or that new frequency bands/channels are available to the second RAT, the device processor may determine whether there is still a likelihood of inter-RAT coexistence interference occurring between the first and second RAT. In response to determining that the first and/or second RAT are no longer at risk of coexistence interference, the device processor may reacquire service with the second RAT, thereby completing a fall back to the preferred combination of the first RAT and the second RAT.

In some embodiments, the device processor may attempt to acquire service with the preferred frequency bands/channels of the first and second RATs. In the event that the second RAT's preferred frequency band/channel is likely to interfere with the first RAT's preferred frequency band/channel, the device processor may attempt to acquire service with any one of the second RAT's available frequency bands/channels (e.g., non-preferred frequency bands/channels) that will not interfere with the first RAT's preferred frequency band/channel. However, in response to determining that each of the second RAT's available frequency bands/channels is likely to interfere with the first RAT's preferred frequency band/channel, the device processor may attempt to acquire service with a third RAT (i.e., a lower priority RAT) that has a frequency band/channel that will not interfere with the first RAT's preferred frequency band/channel.

In some embodiments, in response to determining that there is a likelihood of inter-RAT coexistence interference occurring between the first RAT and the second RAT, the device processor may acquire service with the first RAT and with a third RAT that provides services similar to the second RAT and that also does not interfere with the first RAT. For example, in response to determining that there is a risk of a coexistence event occurring between the first RAT and the second RAT (i.e., an LTE RAT used for data calls), the device processor may identify a third RAT capable of receiving similar data services (e.g., a EV-DO RAT). In some embodiments, the third RAT may have the highest priority, data throughput, quality of services, etc. of a group of RATs that provide services similar to the second RAT.

In some embodiments, in response to determining that there is a risk of a coexistence event occurring between the first RAT and each other RAT on the mobile communication device, the device processor may acquire service with the second RAT and a third RAT that provides services similar to the first RAT and that will not interfere with the second RAT. In other words, in the event that a coexistence event would occur between the first RAT and any other RAT on the mobile communication device, the device processor may forego receiving services from the first RAT (i.e., the highest priority RAT) and may instead attempt to acquire service with the second RAT and a third RAT (a non-interfering, lower-priority RAT).

For ease of reference, a RAT with a highest priority of a plurality of RATs on the mobile communication device is referred to in the description as the first RAT, a RAT with a second highest priority is referred to as the second RAT, and another RAT with a priority that does not exceed the second RAT's priority is referred to as a third RAT. However, these references are merely for ease of description and not intended to imply or require a particular RAT to be a first, second, or third RAT. For example, the second RAT may become the first RAT and the first RAT may become the second RAT in response to a change in priority caused by a user input, a change in location, a change in RF conditions, etc. Similarly, a third RAT may become the first or the second RAT (and vice versa) in response to changes in priorities among the plurality of RATs.

Further, while the embodiment descriptions refer to a mobile communication device capable of supporting two simultaneously active RATs, the mobile communication device may support two or more simultaneously active RATs in some embodiments. In such embodiments, the device processor may perform operations similar to those described above to avoid potential inter-RAT coexistence interference among two or more simultaneously active RATs on the multi-active communication device. For example, on a mobile communication device capable of supporting three simultaneously active RATs, the device processor may determine whether there is a likelihood of a coexistence event occurring between any of the three high-priority RATs (e.g., a first, second, and third RAT) and may acquire service with a non-interfering combination of RATs that may include one or more lower-priority RATs (e.g., a fourth or fifth RAT) in response to determining that one or more of the three high-priority RATs may be at risk of experiencing inter-RAT coexistence interference.

Various embodiments may be implemented within a variety of communication systems 100 that include at least two mobile telephony networks, an example of which is illustrated in FIG. 1. A first mobile network 102 and a second mobile network 104 typically each include a plurality of cellular base stations (e.g., a first base station 130 and a second base station 140). A first mobile communication device 110 may be in communication with the first mobile network 102 through a cellular connection 132 to the first base station 130. The first mobile communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second mobile communication device 120 may similarly communicate with the first mobile network 102 through the cellular connection 132 to the first base station 130. The second mobile communication device 120 may communicate with the second mobile network 104 through the cellular connection 142 to the second base station 140. The cellular connections 132 and 142 may be made through two-way wireless communication links, such as 4G, 3G, CDMA, TDMA, WCDMA, GSM, and other mobile telephony communication technologies.

While the mobile communication devices 110, 120 are shown connected to the mobile networks 102, 104, in some embodiments (not shown), the mobile communication devices 110, 120 may include one or more subscriptions to two or more mobile networks 102, 104 and may connect to those networks in a manner similar to operations described above.

In some embodiments, the first mobile communication device 110 may establish a wireless connection 152 with a peripheral device 150 used in connection with the first mobile communication device 110. For example, the first mobile communication device 110 may communicate over a Bluetooth® link with a Bluetooth-enabled personal computing device (e.g., a "smart watch"). In some embodiments, the first mobile communication device 110 may establish a wireless connection 162 with a wireless access point 160, such as over a Wi-Fi connection. The wireless access point 160 may be configured to connect to the Internet 164 or another network over a wired connection 166.

While not illustrated, the second mobile communication device 120 may similarly be configured to connect with the peripheral device 150 and/or the wireless access point 160 over wireless links.

Figure 2:
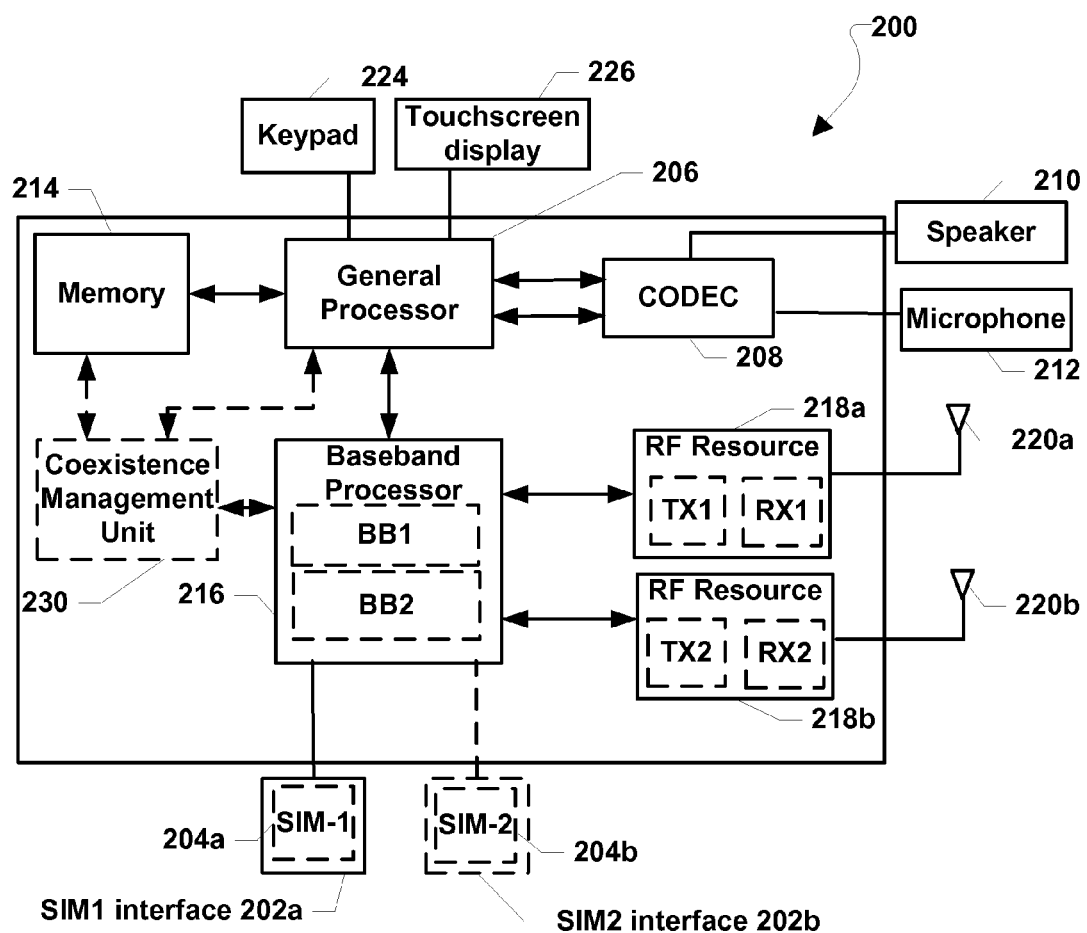
FIG. 2 is a component block diagram of a multi-active communication device according to various embodiments.

FIG. 2 is a functional block diagram of a mobile communication device 200 suitable for implementing various embodiments. According to various embodiments, the mobile communication device 200 may be similar to one or more of the mobile communication devices 110, 120 as described with reference to FIG. 1. With reference to FIGS. 1-2, the mobile communication device 200 may include a first SIM interface 202a, which may receive a first identity module SIM-1 204a that is associated with a first subscription. In optional embodiments, the mobile communication device 200 may optionally include a second SIM interface 202b, which may receive an optional second identity module SIM-2 204b that is associated with a second subscription.

A SIM in various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM, and I/O circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number is printed on the SIM card for identification. However, a SIM may be implemented within a portion of memory of the mobile communication device 200 (e.g., memory 214), and thus need not be a separate or removable circuit, chip or card.

The mobile communication device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer readable storage medium that stores processor-executable instructions. For example, the instructions may include routing communication data relating to the first or second subscription though a corresponding baseband-RF resource chain.

The memory 214 may store an operating system (OS), as well as user application software and executable instructions. The memory 214 may also store application data, such as an array data structure.

The general processor 206 and the memory 214 may each be coupled to at least one baseband modem processor 216. Each SIM in the mobile communication device 200 (e.g., the SIM-1 204a and the SIM-2 204b) may be associated with a baseband-RF resource chain. A baseband-RF resource chain may include the baseband modem processor 216, which may perform baseband/modem functions for communicating with/controlling a RAT, and may include one or more amplifiers and radios, referred to generally herein as RF resources (e.g., RF resources 218a, 218b). In some embodiments, baseband-RF resource chains may share the baseband modem processor 216 (i.e., a single device that performs baseband/modem functions for all SIMs on the mobile communication device 200). In other embodiments, each baseband-RF resource chain may include physically or logically separate baseband processors (e.g., BB1, BB2).

In some embodiments, the RF resources 218a, 218b may be associated with different RATs. For example, a first RAT (e.g., a GSM RAT) may be associated with the RF resource 218a, and a second RAT (e.g., a CDMA or WCDMA RAT) may be associated with the RF resource 218b. The RF resources 218a, 218b may each be transceivers that perform transmit/receive functions on behalf of their respective RATs. The RF resources 218a, 218b may also include separate transmit and receive circuitry, or may include a transceiver that combines transmitter and receiver functions. The RF resources 218a, 218b may each be coupled to a wireless antenna (e.g., a first wireless antenna 220a or a second wireless antenna 220b). The RF resources 218a, 218b may also be coupled to the baseband modem processor 216.

In some embodiments, the general processor 206, the memory 214, the baseband processor(s) 216, and the RF resources 218a, 218b may be included in the mobile communication device 200 as a system-on-chip. In some embodiments, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the mobile communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the mobile communication device 200 to enable communication between them, as is known in the art.

Functioning together, the two SIMs 204a, 204b, the baseband modem processor 216, the RF resources 218a, 218b, and the wireless antennas 220a, 220b may constitute two or more RATs. For example, a SIM, baseband processor and RF resource may be configured to support two different RATs, such as GSM and WCDMA. More RATs may be supported on the mobile communication device 200 by adding more SIM cards, SIM interfaces, RF resources, and/or antennae for connecting to additional mobile networks.

The mobile communication device 200 may include a coexistence management unit 230 configured to manage and/or schedule the RATs' utilization of the RF resources 218a, 218b. In some embodiments, the coexistence management unit 230 may be implemented within the general processor 206. In some embodiments, the coexistence management unit 230 may be implemented as a separate hardware component (i.e., separate from the general processor 206). In some embodiments, the coexistence management unit 230 may be implemented as a software application stored within the memory 214 and executed by the general processor 206. The coexistence management unit 230 may acquire service with a combination of RATs that avoids inter-RAT coexistence interference as described in the disclosure.

Figure 3:
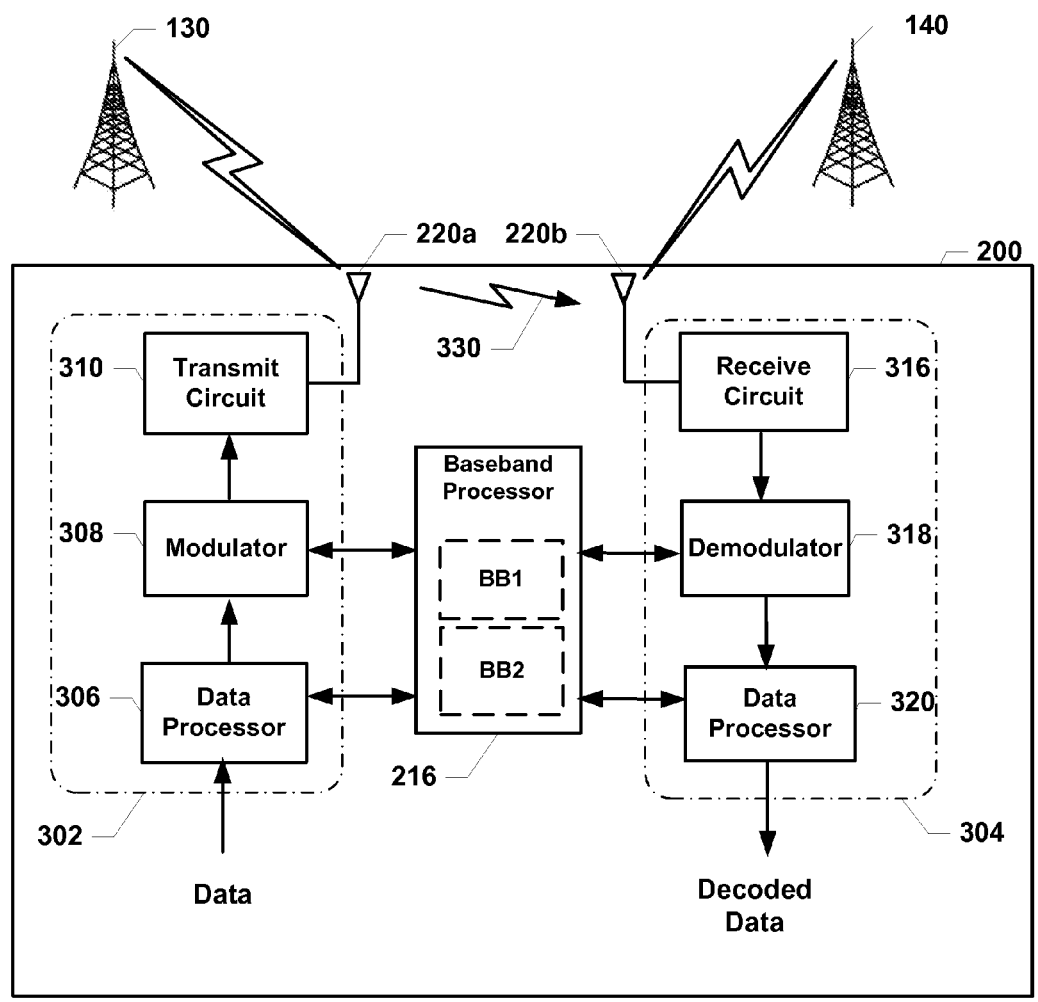
FIG. 3 is a component block diagram illustrating the interaction between components of different transmit/receive chains in a multi-active communication device according to various embodiments.

FIG. 3 is a block diagram of transmit and receive components in separate RF resources on the mobile communication device 200 described above with reference to FIGS. 1-2, according to various embodiments. With reference to FIGS. 1-3, a transmitter 302 may be part of the RF resource 218a, and a receiver 304 may be part of the RF resource 218b. In some embodiments, the transmitter 302 may include a data processor 306 that may format, encode, and interleave data to be transmitted. The transmitter 302 may include a modulator 308 that modulates a carrier signal with encoded data, such as by performing Gaussian minimum shift keying (GMSK). One or more transmit circuits 310 may condition the modulated signal (e.g., by filtering, amplifying, and upconverting) to generate an RF modulated signal for transmission. The RF modulated signal may be transmitted to the first base station 130 via the first wireless antenna 220a, for example.

At the receiver 304, the second wireless antenna 220b may receive RF modulated signals from the second base station 140 on the second wireless antenna 220b. However, the second wireless antenna 220b may also receive some RF signaling 330 from the transmitter 302, which may ultimately compete with the desired signal received from the second base station 140. One or more receive circuits 316 may condition (e.g., filter, amplify, and downconvert) the received RF modulated signal, digitize the conditioned signal, and provide samples to a demodulator 318. The demodulator 318 may extract the original information-bearing signal from the modulated carrier wave, and may provide the demodulated signal to a data processor 320. The data processor 320 may de-interleave and decode the signal to obtain the original, decoded data, and may provide decoded data to other components in the mobile communication device 200. Operations of the transmitter 302 and the receiver 304 may be controlled by a processor, such as the baseband modem processor 216. In various embodiments, each of the transmitter 302 and the receiver 304 may be implemented as circuitry that may be separated from their corresponding receive and transmit circuitries (not shown). Alternatively, the transmitter 302 and the receiver 304 may be respectively combined with corresponding receive circuitry and transmit circuitry, for example, as transceivers associated with the SIM-1 204a and the SIM-2 204b.

Receiver de-sense may occur when transmissions by a first RAT on the uplink (e.g., the RF signaling 330) interferes with receive activity on a different transmit/receive chain associated with a second RAT. The signals received by the second RAT may become corrupted and difficult or impossible to decode as a result of the de-sense or interference. Further, noise from the transmitter 302 may be detected by a power monitor (not shown) that measures the signal strength of surrounding cells, which may cause the mobile communication device 200 to falsely determine the presence of a nearby cell site.

Because inter-RAT coexistence interference may severely degrade the performance of RATs affected by such interference, various embodiments predict and avoid inter-RAT coexistence interference by determining whether there is a likelihood of a coexistence event occurring between two (or more) RATs and attempting to acquire service with non-interfering RATs (e.g., as illustrated with reference to FIGS. 4A-4B).

Figure 4A:
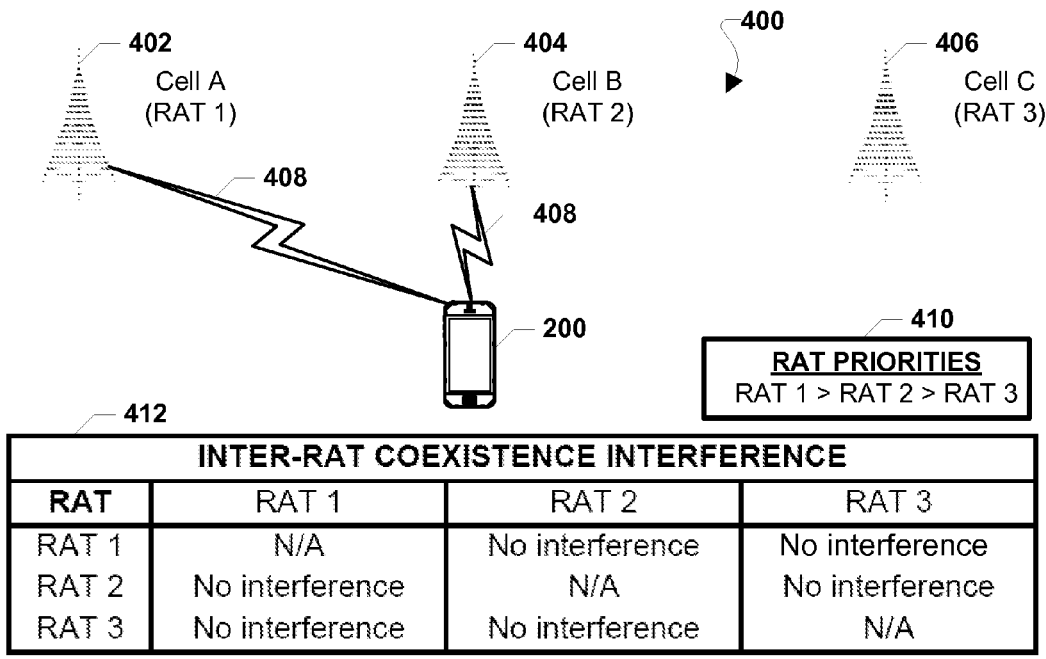
FIGS. 4A-4B are component block diagrams illustrating examples of acquiring service with combinations of RATs that avoid the possibility of inter-RAT coexistence interference according to various embodiments.
Figure 4B:
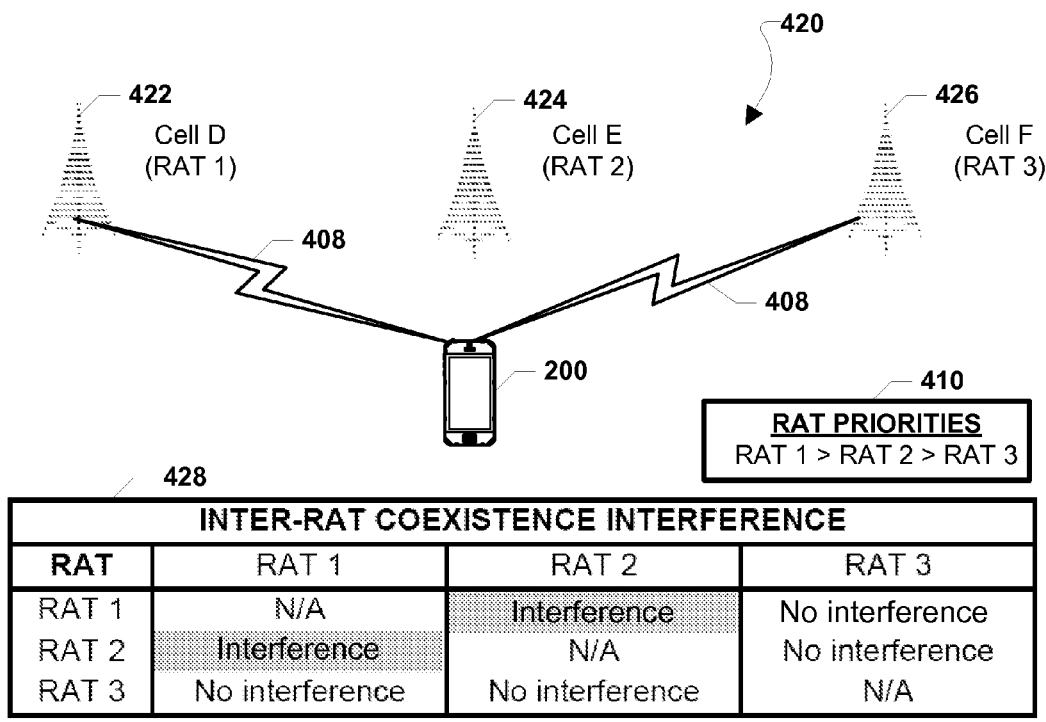

FIGS. 4A-4B are component block diagrams 400, 420 illustrating examples of avoiding coexistence events between RATs on a mobile communication device (e.g., the mobile communication device 200 of FIGS. 2-3) by acquiring service from RATs determined not to be at risk of inter-RAT coexistence interference. With reference to FIGS. 1-4B, the mobile communication device 200 may include two RF resources (e.g., the RF resources 218a, 218b) for use in acquiring services simultaneously via any two of a first RAT (labeled in FIGS. 4A-4B as "RAT 1"), a second RAT (labeled in FIGS. 4A-4B as "RAT 2"), and a third RAT (labeled in FIGS. 4A-4B as "RAT 3"). As described, the RATs on the mobile communication device 200 may be associated with the same subscription/SIM or with two or more different subscriptions.

For example, the mobile communication device 200 may be within service range of a first cell 402 (labeled in FIGS. 4A-4B as "Cell A") that is associated with the first RAT, a second cell 404 (labeled in FIGS. 4A-4B as "Cell B") associated with the second RAT, and a third cell 406 (labeled in FIGS. 4A-4B as "Cell C") associated with the third RAT.

In some embodiments, the mobile communication device 200 may reference an interference data table (e.g., interference data table 412) before acquiring service with the RATs to determine whether there is a likelihood of inter-RAT coexistence interference occurring between two or more RATs. An interference data table may include various types of information that may enable a device processor (e.g., the general processor 206, the baseband modem processor 216, the coexistence management unit 230, a separate controller, and/or the like) on the mobile communication device 200 to determine whether two (or more) RATs are at risk of inter-RAT coexistence interference, such as a list of interfering frequency bands/channels between RATs (e.g., as described with reference to FIGS. 5A-5B). The interferences tables and/or the information included in the tables may be preloaded on the mobile communication device 200, such as by the original equipment manufacturer of the mobile communication device 200. The interference tables may also be received via user input, from a server, from one or more mobile networks associated with one or more subscriptions on the mobile communication device 200, etc.

In the example illustrated in FIG. 4A, the mobile communication device 200 may reference the interference data table 412 to determine that there is no likelihood of inter-RAT coexistence interference occurring between any of the first, second, and third RATs. In other words, the mobile communication device 200 may determine that any two of the first, second, and third RATs would be able to operate without experiencing and/or causing de-sense.

With reference to FIGS. 1-4A, in some embodiments, the mobile communication device 200 may determine an order in which the RATS are utilized to receive service. In particular embodiments, the mobile communication device 200 may maintain a priority list 410 of the first, second, and third RATs used to determine the order in which the RATs are utilized to receive service. For example, the priority list 410 may list the first RAT as having the highest priority, followed by the second RAT and the third RAT, respectively. As the mobile communication device 200 may only support two simultaneous network connections, the mobile communication device 200 may attempt to acquire service with the first RAT and the second RAT based on the priority list 410 because the first and second RATs have the highest priorities and are also not at risk of experiencing or causing inter-RAT coexistence interference. The mobile communication device 200 may not attempt to acquire service from the third cell 406 via the third RAT because the third RAT has the lowest priority of the three RATs on the mobile communication device 200.

Thus, based on the higher priorities of the first and second RATs, the mobile communication device 200 may communicate over wireless connections 408 with the first cell 402 and the second cell 404 via the first and second RATs, respectively.

In the example illustrated in FIG. 4B, the mobile communication device 200 may have changed locations and now may be within service range of a fourth cell 422 (labeled in FIG. 4B as "Cell D") associated with the first RAT, a fifth cell 424 (labeled in FIG. 4B as "Cell E") associated with the second RAT, and a sixth cell 426 (labeled in FIG. 4B as "Cell F") associated with the third RAT. As described, the mobile communication device 200 may maintain the priority list 410, indicating that the first RAT has the highest priority, followed by the second RAT and the third RAT, respectively.

With reference to FIGS. 1-4B, prior to attempting to acquire service with any of the first, second, and third RATs, the mobile communication device 200 may reference an interference data table 428 to determine whether there is a likelihood of a coexistence event occurring between any of the RATs at the current location. As illustrated in the interference data table 428, the mobile communication device 200 may determine that there is a likelihood that the first RAT and second RAT will interfere with one another. Thus, while the first and second RATs have the highest priorities, acquiring service with the first and second RATs may cause the mobile communication device 200 to experience an overall degraded performance.

Thus, the mobile communication device 200 may reference the interference data table 428 to determine whether there is another RAT that may be used simultaneously with the first RAT (i.e., the highest priority RAT) without resulting in inter-RAT coexistence interference. As indicated in the interference data table 428, the mobile communication device 200 may determine that the first RAT and the third RAT do not interfere with each other. As a result, the mobile communication device 200 may establish wireless connections 408 with the fourth cell 422 and the sixth cell 426 to receive service via the first and third RATs, respectively.

In some embodiments, the mobile communication device 200 may continue acquiring service with the first and third RATs until the mobile communication device 200 determines that there is no longer a risk of inter-RAT coexistence interference between the first and second RATs, which may occur for example when the first RAT performs a handoff to another cell and/or when the new frequency bands/channels become available to the second RAT. In response to determining that the first and second RATs are no longer at risk of experiencing inter-RAT coexistence interference, the mobile communication device 200 may switch services from the third RAT to the second RAT because the second RAT has a higher priority. Thus, the mobile communication device 200 may avoid/prevent degraded RAT performance by temporarily receiving service with lower-priority RATs, and the mobile communication device 200 may revert back to receiving service from higher-priority RATs when those higher-priority RATs are no longer at risk of causing and/or experiencing a coexistence event.

Figure 5A:
FIGS. 5A-5B are example data tables including information regarding available and interfering frequency bands for a plurality of RATs operating on a multi-active communication device according to various embodiments.
Figure 5B:

As described, a mobile communication device may anticipate/predict when a coexistence event will occur between two RATs by performing a look-up operation in an interference data table stored in memory (e.g., memory 214, memory in the coexistence management unit 230, or the like). FIGS. 5A-5B illustrate example data tables 500, 525 that a mobile communication device (e.g., the mobile communication devices 110, 120, 200 described with reference to FIGS. 1-4B) may reference to anticipate and avoid potential inter-RAT coexistence interference.

With reference to FIGS. 1-5B, the example data table 500 may include a list of the frequency bands currently available to (i.e., within service range of) each of three RATs operating on the mobile communication device. The information may indicate that a first RAT operating on the mobile communication device (labeled in FIG. 5A as "RAT 1") is receiving signals from and thus is capable of utilizing bands A and B; that a second RAT on the device (labeled in FIG. 5A as "RAT 2") is receiving signals from and thus is capable of utilizing bands Q and R; and that a third RAT on the device (labeled in FIG. 5A as "RAT 3") is receiving signals from and thus is capable of utilizing bands X and Y.

The data table 500 may also indicate each RAT's preferred frequency band(s). For example, the first RAT's preferred frequency band/channel may be band A, the second RAT's preferred frequency band/channel may be band R, and the third RAT's preferred frequency band/channel may be band X. In some embodiments, a RAT's preferred frequency band/channel may be a predetermined band/channel through which the RAT may receive the best service, data throughput, etc. In such embodiments, the mobile communication device may attempt to acquire service with a RAT's preferred frequency band/channel when possible and may use other, non-preferred bands/channels in the event that a preferred frequency is unavailable or interferes with the frequency band/channel of another RAT, such as a higher priority RAT.

In some embodiments, a device processor (e.g., the general processor 206, the baseband modem processor 216, the coexistence management unit 230, a separate controller, and/or the like) may identify the available frequency bands for each RAT by performing a frequency band scan to detect the frequency bands available for each RAT at the current location. In some embodiments, the device processor may receive information regarding available frequency bands for each RAT operating on the mobile communication device directly from each of those RATs and/or indirectly from those RATs' respective networks.

As described, frequency bands used by two or more RATs may interfere with each other, thereby introducing the possibility that inter-RAT coexistence interference may occur on the mobile communication device and may degrade one or more RATs' performance. In the example of the band interference data table 525 may include information regarding frequency bands that interfere with each other for use in determining whether there is a likelihood that a coexistence event will occur on the mobile communication device. For example, if frequency band R is currently available to the second RAT, the device processor may use the band interference data table 525 to determine that frequency bands A, B, and Y will interfere with the band R. Thus, by using the band interference data table 525, the device processor may easily determine the frequency bands that interfere between two or more RATs in order to avoid the potential for interference between those RATs.

In some embodiments, the device processor may utilize the information included in each of the data tables 500, 525 to identify potentially problematic combinations of frequency bands and/or RATs. For example, the device processor may perform table lookups of the first and second RATs' available frequency bands (e.g., as illustrated in the data table 500) in the band interference data table 525 and determine that both of the available frequency bands Q and R associated with the second RAT interfere with the first RAT's available frequency bands A and B. Thus, the device processor may determine that there is no combination of frequency bands for the first RAT and the second RAT that would avoid inter-RAT coexistence based on those the table look-up operations.

However, the device processor may use the information stored in the data tables 500, 525 to determine that the first RAT's preferred frequency band A does not interfere with the third RAT's frequency band Y, and as a result, the device processor may attempt to acquire service with the first RAT via frequency band A and with the third RAT via frequency band X. As a result, the first and third RATs may receive service while avoiding the possibility of inter-RAT coexistence interference.

Two bands may interfere with each other in the event that the frequency bands are the same, overlap, and/or otherwise have characteristics (e.g., be harmonics or subharmonics thereof) known to cause interference with each other. Such interference can be determined in advance by a manufacturer of the mobile communication device, a manufacturer of the modems, network operators, and independent parties (e.g., protocol organization, independent testing labs, etc.). Thus, the band interference data table 525 may be predefined and loaded in memory of the mobile communication device, within one or more of the SIMs, or within a modem within the device. In some embodiments the mobile communication device may be configured to generate a band interference data table by recognizing when de-sense is occurring and recording the frequency bands in use at the time by each of the RATs.

In various embodiments, a band interference data table (e.g., the data tables 500, 525) may be organized according to a variety of data structures or formats, such as an associative list, a database, a linked list, etc. For example, the band interference data table 525 is a simple data table in which a first frequency band can be used as a look-up data field to determine the frequency bands that will interfere with that frequency band.

Figure 6:
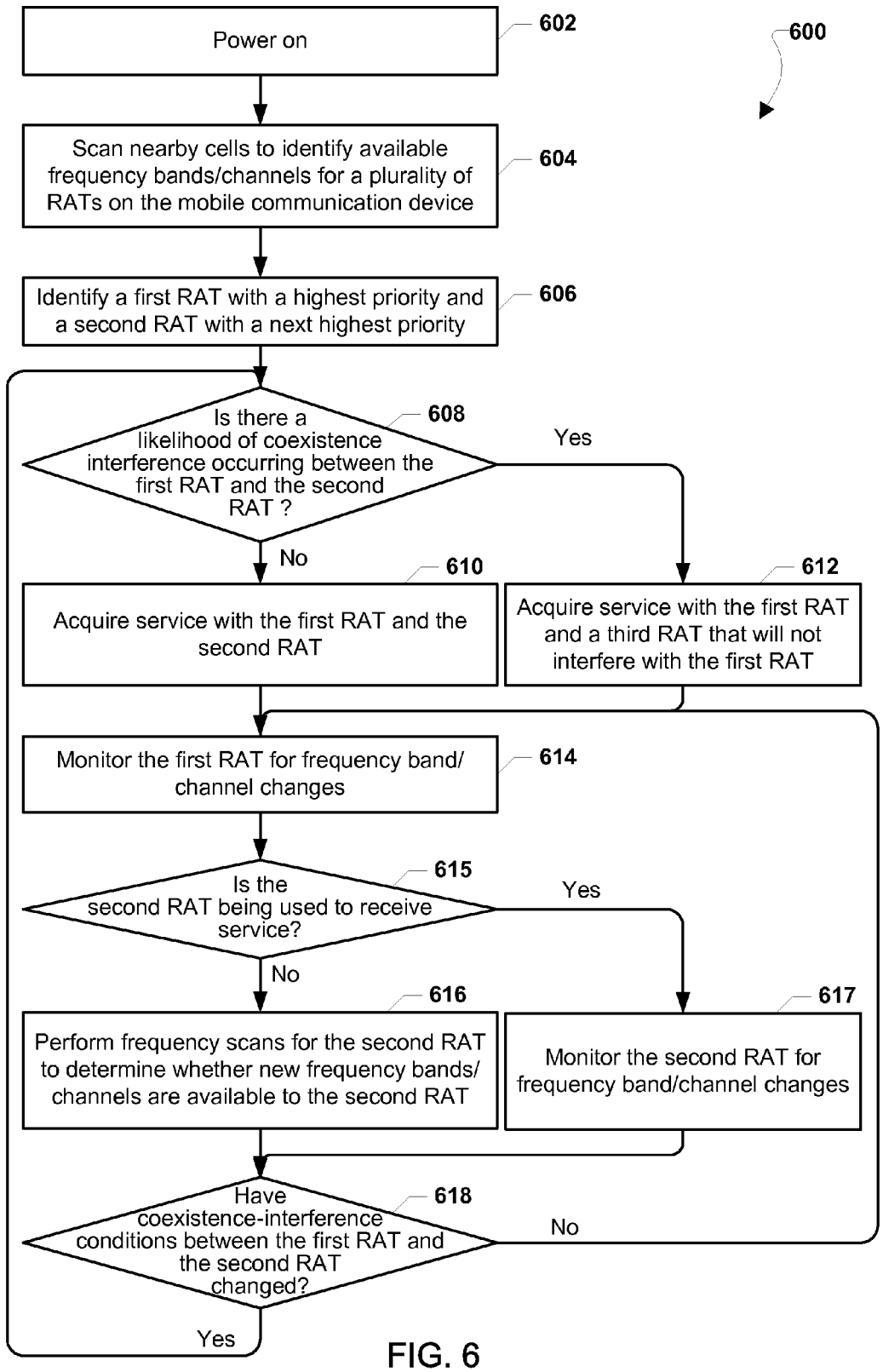
FIG. 6 is a process flow diagram illustrating a method for acquiring service with a plurality of RATs to avoid a likelihood of inter-RAT coexistence interference occurring on a mobile communication device according to various embodiments.

FIG. 6 illustrates an embodiment method 600 that may be implemented with a processor (e.g., the general processor 206 of FIG. 2, the baseband modem processor 216, the coexistence management unit 230, a separate controller, and/or the like) on a mobile communication device (e.g., the mobile communication device 200 described with reference to FIGS. 2-4) for avoiding inter-RAT coexistence interference. With reference to FIGS. 1-6, the device processor may begin performing operations of the method 600 in response to the mobile communication device's powering on in block 602.

In block 604, the device processor may scan nearby cells to identify available frequency bands/channels for a plurality of RATs on the mobile communication device, such as by performing a frequency band scan using known techniques. In some embodiments, the device processor may store the results of the frequency band scan for each RAT on the mobile communication device in a data table (e.g., the data table 500 of FIG. 5A) for use in determining whether there is a likelihood of inter-RAT coexistence interference between two or more RATs, as further described with reference to determination block 608.

In block 606, the device processor may identify a first RAT with a highest priority and a second RAT with the next highest priority. In some embodiments, priorities of the plurality of RATs may be set based on one or more factors, including user preference, current channel conditions, current or intended operations/services of the RATs (e.g., servicing a voice call versus a data call), available quality of service, service plans, service fees, etc. For example, the device processor may receive user preferences by a user input interface indicating that a particular RAT should have the highest priority because its data plan has lower costs than those of the other RATs.

In some embodiments, the first and second RATs may be selected from a plurality of RATs that are capable of acquiring/receiving service in the current location. For example, the first RAT may have the highest priority among a plurality of RATs capable of receiving service in the current location (e.g., when the current location is within the home network of the first RAT while use of other RATs may incur roaming fees). Thus, the priorities of the plurality of RATs may change depending on geographical location and available cell/base stations.

In determination block 608, the device processor may determine whether there is a likelihood of inter-RAT coexistence interference occurring between the first RAT and the second RAT, such as by determining whether there is a combination of frequency bands/channels for the first and second RATs that do not interfere with each other (e.g., as described with reference to FIG. 7). In other words, the device processor may determine whether the performance of the first RAT (and/or the second RAT) is at risk of being degraded due to inter-RAT coexistence interference that may occur at some later time. In some embodiments, the device processor may determine whether the preferred frequency bands/channel of the second RAT would interfere with the preferred or any frequency band/channel available to the first RAT (e.g., as described with reference to FIG. 8).

In some embodiments, because the first RAT has a higher priority than the second RAT, the device processor may base the determination in determination block 608 on whether the second RAT is likely to de-sense the first RAT in order to prevent the first RAT from experiencing degraded performance. In such embodiments, there may a likelihood of coexistence interference occurring when there is a risk of the second RAT de-sensing the first RAT. In some embodiments, the device processor may also or alternatively consider whether the first RAT is likely to de-sense the second RAT to ensure that the performance of the second RAT is not degraded.

In some embodiments, the device processor may make the determination in determination block 608 by referencing one or more data tables that include information regarding the available and interfering frequency bands of the first and second RATs (e.g., as described with reference to FIGS. 5A, 5B).

In response to determining that there is no likelihood of inter-RAT coexistence interference occurring between the first RAT the second RAT (i.e., determination block 608="No"), the device processor may acquire service with the first RAT and second RAT in block 610. For example, the device processor may enable the first and second RATs to camp on nearby base stations that support their respective mobile networks. In some embodiments, the device processor may acquire service with the first and second RATs with non-interfering frequency bands/channels.

In response to determining that there is a likelihood of inter-RAT coexistence interference occurring between the first RAT and the second RAT (i.e., determination block 608="Yes"), the device processor may acquire service with the first RAT and a third RAT that will not interfere with the first RAT, in block 612. In some embodiments of the operations performed in block 612, the device processor may identify one or more of the plurality of RATs on the mobile communication device that will not interfere with the first RAT, such as by performing look-up operations in an interference table (e.g., the data tables 500, 525), and may select one of the RATs that is not likely to interfere with the first RAT. In some embodiments, the selected RAT may have the highest priority among the RATs that are not likely to interfere with the first RAT.

In some embodiments, the third RAT may provide services similar to the second RAT, and the device processor may select the third RAT based on similarities in services (e.g., as described with reference to FIGS. 9A-9B). For example, the device processor may select a particular third RAT (e.g., an EV-DO RAT) capable of receiving/performing data services to serve as a substitute for the data services of the second RAT (e.g., an LTE RAT). In such embodiments, the third RAT may provide services that are comparable to, but not necessarily the same as, the second RAT's services.

Regardless of whether the device processor acquires service with the first RAT and the second RAT in block 610 or acquires service with the first RAT and the third RAT in block 612, the device processor may monitor the first RAT for frequency band/channel changes in block 614. In some embodiments, the device processor may monitor one or more components on the mobile communication device that may indicate that the first RAT has performed or is about to perform a hand off to a different cell/base station that uses a different frequency band/channel for communication. For example, the device processor may recognize when the first RAT performs reselection operations to camp on a different base station in a new geographic location using a different frequency band/channel.

In determination block 615, the device processor may determine whether the second RAT is being used to receive service. In other words, the device processor may determine whether to monitor the second RAT for frequency band/channel changes in block 617 as the second RAT is being actively used to receive service or to perform background frequency band scans in block 616 because the second RAT is not in service or is not being used to receive service. In some embodiments, the device processor may make a determination in determination block 615 based on whether service is acquired with the second RAT in block 610 or with a third RAT in block 612.

Thus, in response to determining that the second RAT is being used to receive service (i.e., determination block 615="Yes"), the device processor may monitor the second RAT for frequency band/channel changes, such as by performing operations similar to those described in block 614 for monitoring the first RAT for frequency band/channel changes.

In response to determining that the second RAT is not being used to receive service (i.e., determination block 615="No"), the device processor may perform background frequency scanning for the second RAT to determine whether new frequency bands/channels are available to the second RAT, in block 616. In some embodiments of the operations performed in block 616, the device processor may perform background scans of nearby cells to determine the available frequency bands/channels for the second RAT as generally described above in block 604.

In some embodiments, the device processor may update a data table of frequency bands available to the first RAT and to the second RAT in response to performing the operations in block 614, 616, and/or 617.

By monitoring the first RAT for changes in frequency bands/channels in block 614 and/or by one of determining whether new or different frequency bands/channels are available to the second RAT in block 616 and monitoring the second RAT for frequency band/channel changes in block 617, the device processor may determine whether coexistence-interference conditions between the first RAT and second RAT have changed in determination block 618. In other words, the device processor may determine whether a fall back to a preferred RAT combination (i.e., the first RAT and the second RAT) may be possible in light of new or changed interference conditions. For example after acquiring service with the first RAT and a third RAT in block 612 in response to determining that there were no non-interfering frequency bands/channel combinations for the first RAT and second RAT (i.e., determination block 608="Yes"), the device processor may determine whether the second RAT has new frequency band/channels available that may not interfere with one or more of the first RAT's frequency bands/channels.

In response to determining that the coexistence-interference conditions between the first RAT and the second RAT have not changed (i.e., determination block 618="No"), the device processor may repeat the above operations by again monitoring for changes in the first RAT's frequency bands/channels in block 614 and by performing frequency scans for the second RAT in block 616 to determine whether new or different frequency band/channels are available to the second RAT or by monitoring the second RAT's frequency bands/channels in block 617 until the device processor determines that coexistence-interference conditions have changed, in determination block 618.

In response to determining that coexistence-interference conditions between the first RAT and a second RAT have changed (i.e., determination block 618="Yes"), the device processor may repeat the operations of the method 600 by again determining whether there is a likelihood that a coexistence event between the first RAT and second will occur in determination block 608. For example, in response to determining that the first RAT and the second RAT are no longer at risk of interfering with each other in light of the changed coexistence-interference conditions, the device processor may initiate a fall-back operation by acquiring service with the first RAT and the second RAT in block 610.

Figure 7:
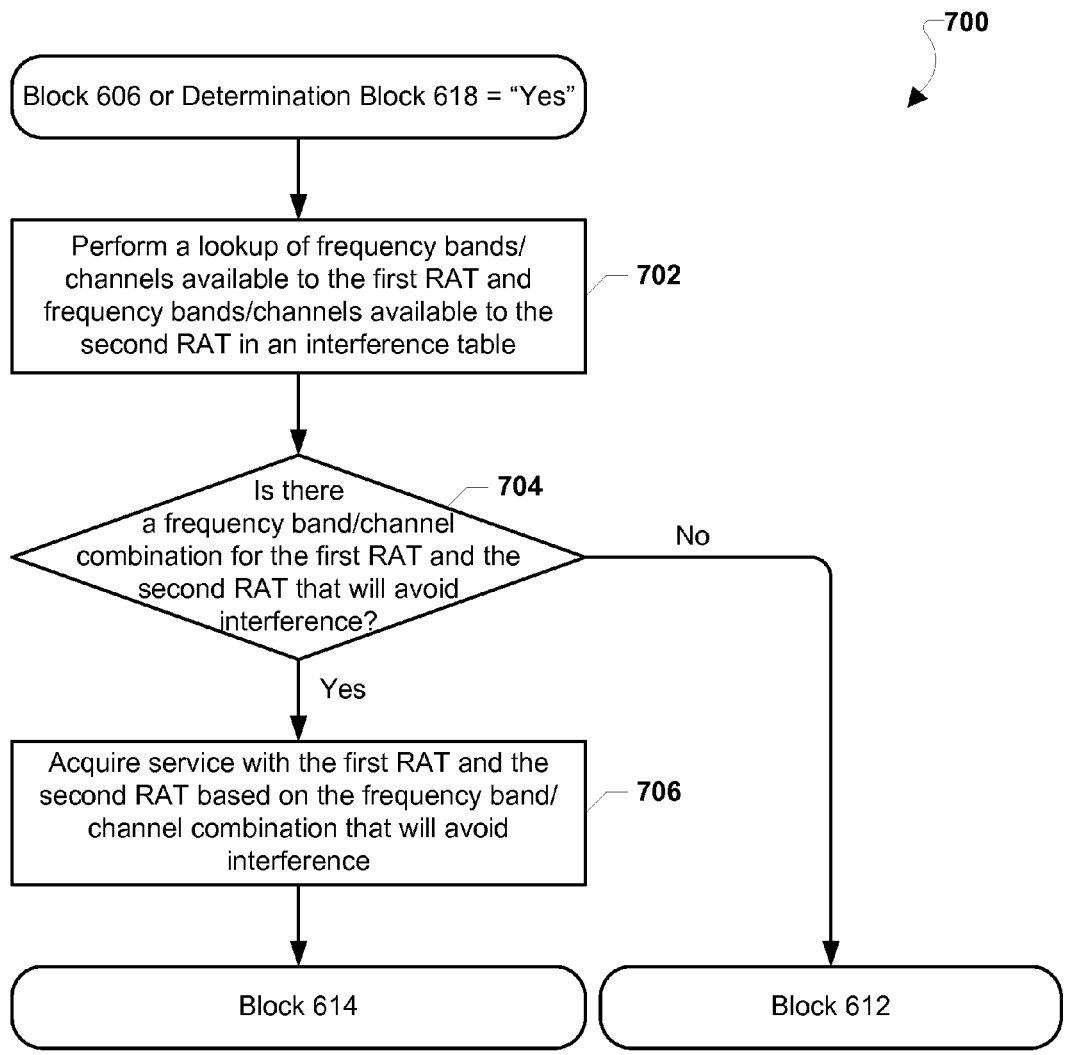
FIG. 7 is a process flow diagram illustrating a method for performing a lookup in an interference data table to determine whether there is a combination of frequency bands for a first RAT and a second RAT on a mobile communication device that will avoid inter-RAT coexistence interference according to various embodiments.

FIG. 7 illustrates a method 700 that may be implemented by a processor (e.g., the general processor 206 of FIG. 2, the baseband modem processor 216, the coexistence management unit 230, a separate controller, and/or the like) on a mobile communication device (e.g., the mobile communication device 200 of FIG. 2) for determining whether there is a frequency-band/channel combination for the first RAT and the second RAT that will avoid inter-RAT coexistence interference. The operations of the method 700 implement some embodiments of the operations of blocks 608, 610 of the method 600 described with reference to FIG. 6. Thus, with reference to FIGS. 1-7, the device processor may begin performing the operations of the method 700 in response to identifying a first RAT with a highest priority and a second RAT with a next highest priority in block 606 of the method 600. In some embodiments, the device processor may begin performing the operations of the method 700 in response to determining that coexistence-interference conditions between the first RAT and the second RAT have changed in (i.e., determination block 618="Yes" of the method 600).

As described (e.g., with reference to FIGS. 4A-5B), the device processor may maintain or reference an interference data table that includes information regarding the likelihood that two or more RATs will experience inter-RAT coexistence interference. By utilizing such an interference table, the device processor may quickly and efficiently identify potentially problematic combinations of interfering RATs that may result in reduced performance of one or more RATs on the mobile communication device.

In block 702, the device processor may perform a table lookup of frequency bands/channels available to the first RAT and the second RAT in an interference data table in order to identify frequency-band/channel combinations that may result in inter-RAT coexistence interference between the first RAT and the second RAT. In some embodiments (e.g., as described with reference to FIGS. 5A-5B), the device processor may compare the currently available frequency bands/channels of the second RAT with the frequency bands/channels currently available to the first RAT. In an example (as illustrated in FIG. 4A), frequency bands A and B may be currently available to the first RAT, and frequency bands Q and R may be available to the second RAT.

Based on the table lookup performed in block 702, the device processor may determine whether there is a frequency-band/channel combination for the first RAT and the second RAT that will avoid inter-RAT coexistence interference between the first RAT and the second RAT, in determination block 704. In other words, the device processor may determine whether there is at least one frequency band/channel available to the first RAT and to the second RAT that are not likely to interfere with each other. In the above example, the device processor may compare the first RAT's frequency bands A and B with the second RATs frequency bands Q and R to determine whether there is no combination of frequency bands for the first and second RATs that avoids inter-RAT coexistence interference. In some embodiments, the operations of blocks 702 and 704 may be performed in a single operation as the result of the table look-up operation may be the basis of the determination made in the determination block 704.

In response to determining that there is no combination of frequency bands/channels for the first RAT and the second RAT that will avoid inter-RAT coexistence interference (i.e., determination block 704="No"), the device processor may acquire service with the first RAT and a third RAT that avoids coexistence interference with the first RAT in block 612 of the method 600 (FIG. 6) and may continue performing the operations of the method 600 as described. Thus, in circumstances in which the device processor determines that the first RAT and the second RAT may be unable to operate simultaneously without creating a coexistence event, the device processor may attempt to acquire service with the first RAT (i.e., the highest priority RAT) and may not attempt to acquire service with the second RAT as the second RAT may have a lower priority the first RAT. In some embodiments, the device processor may attempt to acquire service on the third RAT using a frequency band/channel determined (i.e., via a look up in the interference data table) not to interfere with one or more of the first RATs available frequency bands/channels.

In response to determining that there is a frequency-band/channel combination that will avoid inter-RAT coexistence interference between the first RAT and the second RAT (i.e., determination block 704="Yes"), the device processor may acquire service with the first RAT and the second RAT based on the combination of frequency bands/channels that will avoid inter-RAT coexistence interference in block 706. The device processor may continue monitoring the first RAT's frequency bands/channel for changes in block 614 of the method 600, and may continue performing the operations of the method 600 as described.

Figure 8:
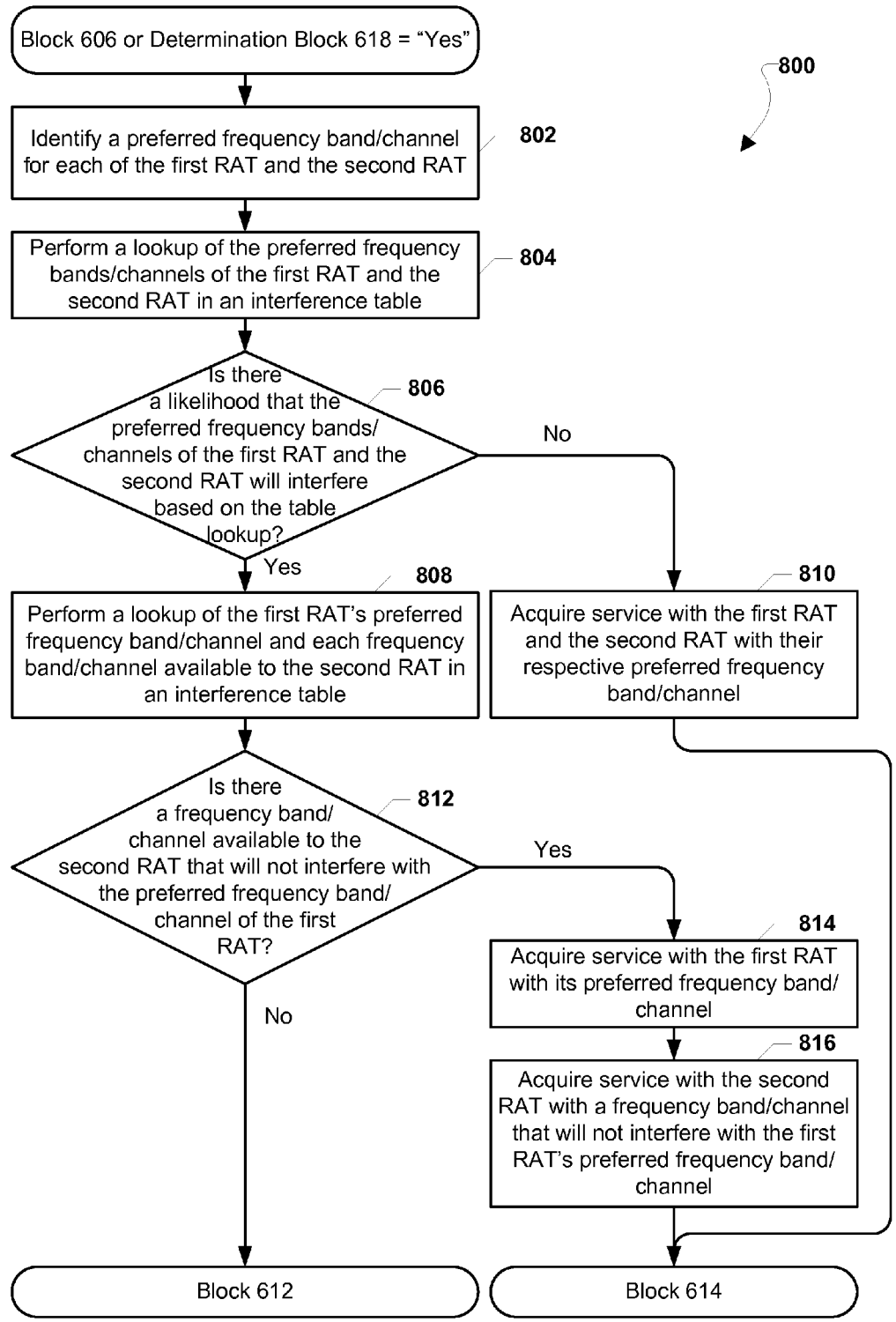
FIG. 8 is a process flow diagram illustrating a method for acquiring service with a first RAT and a second RAT with their preferred frequency bands/channels while avoiding inter-RAT coexistence interference according to various embodiments.

FIG. 8 illustrates a method 800 that may be implemented by a processor (e.g., the general processor 206 of FIG. 2, the baseband modem processor 216, the coexistence management unit 230, a separate controller, and/or the like) on a mobile communication device (e.g., the mobile communication device 200 of FIG. 2) for determining whether there is a likelihood that the preferred frequency bands/channels of the first RAT and second RAT interfere with each other. The operations of the method 800 implement some embodiments of the operations of blocks 608, 610 of the method 600 described with reference to FIG. 6. Thus, with reference to FIGS. 1-8, the device processor may begin performing the operations of the method 800 in response to identifying a first RAT with a highest priority and a second RAT with a next highest priority in block 606 of the method 600. In some embodiments, the device processor may begin performing the operations of the method 800 in response to determining that coexistence-interference conditions between the first RAT and the second RAT have changed (i.e., determination block 618="Yes" of the method 600).

In some embodiments, the device processor may attempt to acquire service with the first RAT and the second RAT using their respective preferred frequency bands/channels, which may include frequency bands/channels that provide certain quality of service or that have been designated as preferred based on user input.

In block 802, the device processor may identify a preferred frequency band/channel for each of the first RAT and the second RAT. In some embodiments, the device processor may reference a table of frequency bands/channels currently available to the first and second RATs to identify which of the available frequency bands/channels are preferred (e.g., as described with reference to the data table 500 in FIG. 5A).

In block 804, the device processor may perform a lookup of the preferred frequency bands/channels of the first RAT and the second RAT in an interference data table. In determination block 806, the device processor may determine whether there is a likelihood that the preferred frequency bands/channels of the first RAT and the second RAT will interference based on the table lookup performed in block 804. For instance, in the examples illustrated (e.g., with reference to FIGS. 5A-5B), the device processor may perform a lookup in the band interference data table 525 to determine whether a preferred frequency band Q of the second RAT interferes with a preferred frequency band A of the first RAT, and vice versa. In some embodiments, the operations performed in the determination block 806 may be similar to the operations described with reference to determination block 704 of the method 700 (FIG. 7).

In response to determining that the preferred frequency bands/channels of the first RAT and the second RAT will not interfere with each other (i.e., determination block 806="No"), the device processor may acquire service with the first RAT and the second RAT with their respective preferred frequency bands/channel in block 810.

In response to determining that there is a likelihood that the preferred frequency bands/channels of the first RAT and the second RAT will interfere with each other (i.e., determination block 806="Yes"), the device processor may perform a lookup operations for the first RAT's preferred frequency bands/channel and each frequency band/channel available to the second RAT in an interference data table in block 808. Based on the interference data table lookup performed in block 808, the device processor may determine whether there is a frequency band/channel available to the second RAT that will not interfere with the preferred frequency bands/channel the first RAT in determination block 812, because the first and second RATs may be unable to utilize their preferred frequency bands/channels due to the determined likelihood of inter-RAT coexistence interference (i.e., determination block 806="Yes"). In some embodiments, the device processor may attempt to acquire service with the preferred frequency band/channel of the first RAT—even when doing so may require the second RAT to use a non-preferred frequency band/channel—when the first RAT has a higher priority than the second RAT.

In response to determining that each frequency band/channel available to the second RAT is likely to cause inter-RAT coexistence interference with the preferred frequency band/channel of the first RAT (i.e., determination block 812="No"), the device processor may acquire service with the first RAT and a third RAT that will not interfere with the first RAT in block 612 of the method 600, and the device processor may continue performing the operations of the method 600 as described. In some embodiments of the operations performed in block 612 of the method 600, the device processor may acquire service with the first RAT using a preferred frequency bands/channel.

In response to determining that there is a frequency band/channel available to the second RAT that will not interfere with the preferred frequency band/channel the first RAT (i.e., determination block 812="Yes"), the device processor may acquire service with the first RAT with its preferred frequency bands/channel in block 814, and may acquire service with the second RAT with the frequency band/channel that will not interfere with the first RAT's preferred frequency bands/channel in block 816.

The device processor may continue monitoring the first RAT for changes in available frequency bands/channels in block 614 of the method 600 and may continue performing the operations of the method 600 as described.

Figure 9A:
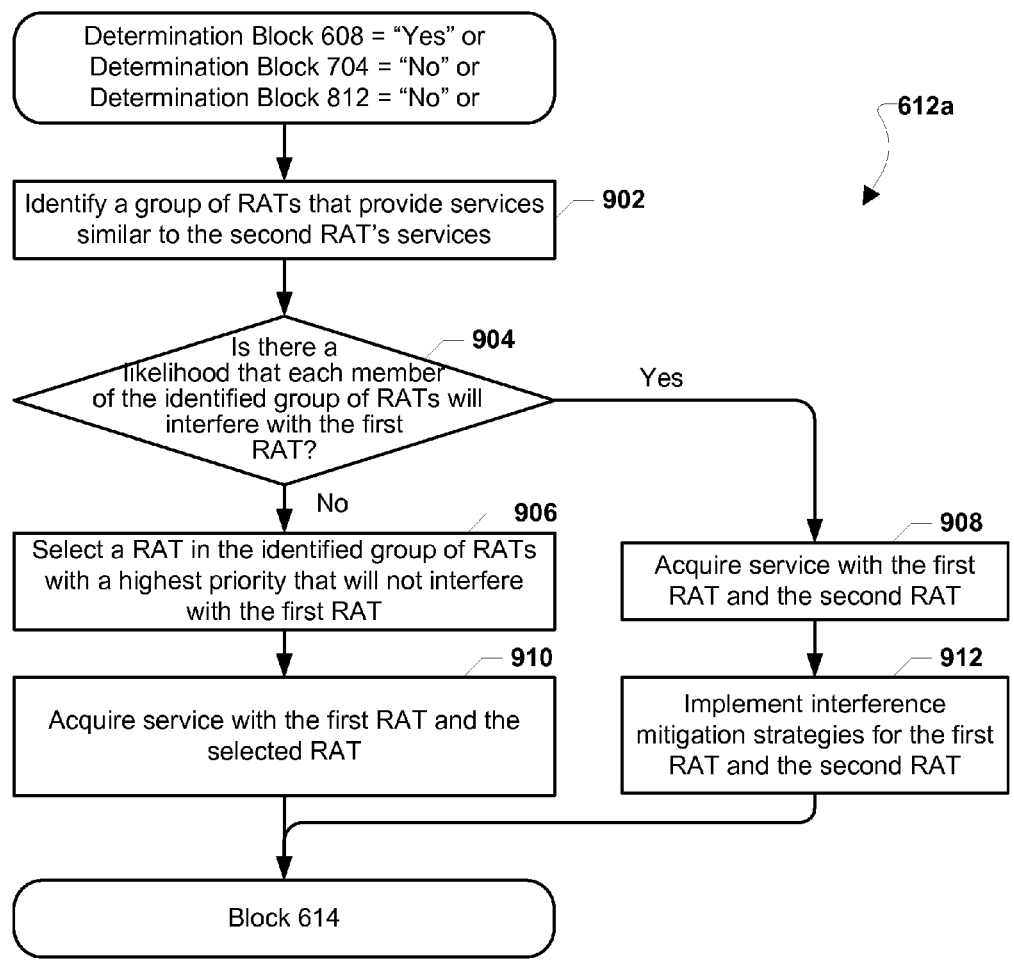
FIGS. 9A-9D are process flow diagrams illustrating methods for acquiring service with a first RAT and a third RAT in response to determining that there is a likelihood of inter-RAT coexistence interference between the first RAT and a second RAT according to various embodiments.

FIG. 9A illustrates an embodiment method 612a that may be implemented by a processor (e.g., the general processor 206 of FIG. 2, the baseband modem processor 216, the coexistence management unit 230, a separate controller, and/or the like) on a mobile communication device (e.g., the mobile communication device 200 of FIG. 2) for acquiring service with a first RAT and a third RAT to avoid inter-RAT coexistence interference between the first RAT and the second RAT. The operations of the method 612a implement some embodiments of the operations of block 612 of the method 600 described with reference to FIG. 6.

With reference to FIGS. 1-9A, the device processor may begin performing the operations of the method 612a in response to determining that there is a likelihood that a coexistence event between the first RAT and the second RAT would occur (i.e., determination block 608="Yes" in the method 600). In some embodiments, the device processor may begin performing the operations of the method 612a in response to determining that no frequency-band/channel combination for the first RAT and the second RAT will avoid inter-RAT coexistence interference (i.e., determination block 704="No" in the method 700). In some embodiments, the device processor may begin performing the operations of the method 612a in response to determining that every frequency band/channel available to the second RAT will interfere with the preferred frequency band/channel of the first RAT (i.e., determination block 812="No" in the method 800).

In the event that the second RAT is unavailable for use because it interferes with the first RAT, the device processor may attempt to acquire service with a third RAT that provides the same or similar services as the second RAT to approximate the services that are available to the mobile communication device when the second RAT is available. Thus, the device processor may attempt to mitigate the overall effects on the availability and quality of received services of using a third RAT instead of the second RAT.

In block 902, the device processor may identify a group of RATs (i.e., at least one RAT) that provide services similar to the second RAT's services, such as by determining the services provided by the second RAT and comparing those services with services provided by other RATs on the mobile communication device. For example, the device processor may identify a group of RATs that provide data services because the second RAT primarily provides data services.

In determination block 904, the device processor may determine whether there is a likelihood that each member of the group of RATs identified in block 902 will individually interfere with the first RAT. In some embodiments of the operations performed in determination block 904, the device processor may perform a lookup in an interference data table that includes information regarding each RAT's priority, available frequency bands/channels, potential interference conflicts with other RATs, etc. In such embodiments, the device processor may be able to determine whether there are any RATs in the identified group of RATs that will not interfere with the first RAT, as well as the relative priorities of those RATs, in a single lookup operation. Thus, in response to determining that at least one of the identified group of RATs is not likely to interfere with the first RAT (i.e., determination block 904="No"), the device processor may select a RAT in the identified group of RATs with a highest priority that will not interfere with the first RAT in block 906.

In block 910, the device processor may acquire service with the first RAT and the selected RAT in the identified group of RATs. By acquiring service with the selected RAT, the device processor may ensure that the first RAT and the selected RAT may operate without a risk of inter-RAT coexistence interference.

In response to determining that there is a likelihood that each member of the identified group of RATs will interfere with the first RAT (i.e., determination block 904="Yes"), the device processor may acquire service with the first RAT and the second RAT in block 908. In some embodiments of the operations performed in block 908, because each of the identified group of RATs and the second RAT may interfere with the first RAT, the device processor may receive service with the second RAT instead of any of the identified group of RATs because the second RAT may have a higher overall priority. Thus, while the first RAT and a second RAT may occasionally experience degraded performance due to inter-RAT coexistence interference, the first and second RATs may provide an overall better performance than another combination of RATs (e.g., the first RAT and a RAT in the identified group). The device processor may also implement interference mitigation strategies for the first RAT and the second RAT in block 912 according to known methods, such as by implementing transmit/receive blanking, power back offs, etc.

The device processor may continue monitoring the first RAT for a frequency band/channel change in block 614 of the method 600, and may continue performing the operations of the method 600 as described.

Figure 9B:
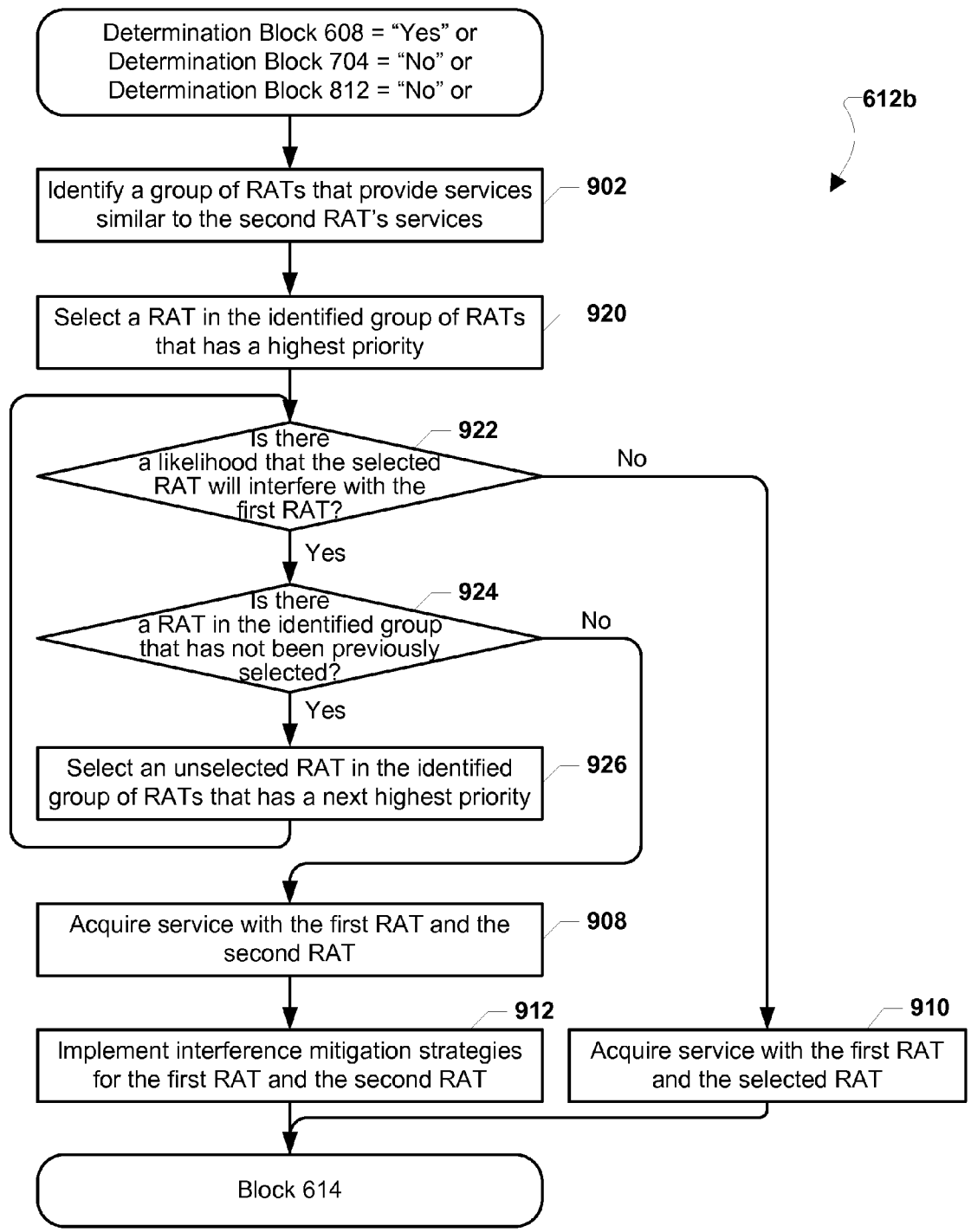

FIG. 9B illustrates an embodiment method 612b that may be implemented by a processor (e.g., the general processor 206 of FIG. 2, the baseband modem processor 216, the coexistence management unit 230, a separate controller, and/or the like) on a mobile communication device (e.g., the mobile communication device 200 of FIG. 2) for acquiring service with the first RAT and a third RAT to avoid inter-RAT coexistence interference between the first RAT and the second RAT. The operations of the method 612b implement some embodiments of the operations of block 612 of the method 600 described with reference to FIG. 6.

With reference to FIGS. 1-9B, the device processor may begin performing the operations of the method 612b in response to determining that there is a likelihood that the second RAT will interfere with the first RAT (i.e., determination block 608="Yes" in the method 600). In some embodiments, the device processor may begin performing the operations of the method 612b in response to determining that there is no frequency-band/channel combination for the first RAT and the second RAT that will avoid inter-RAT coexistence interference (i.e., determination block 704="No" in the method 700). In some embodiments, the device processor may begin performing the operations of the method 612b in response to determining that every frequency band/channel available to the second RAT will interfere with the preferred frequency band/channel of the first RAT (i.e., determination block 812="No" in the method 800).

In block 902, the device processor may identify a group of RATs that provide services similar to the second RAT's services, such as by performing the operations described with reference to block 902 of the method 612a.

In block 920, the device processor may select a RAT in the identified group of RATs that has a highest priority within the group. In some embodiments, the device processor may rank each member of the identified group based on their respective priorities, such as by performing a lookup in a table that includes priority information for each RAT on the mobile communication device, and may use the priority information for the identified group of RATs to determine the RAT in the identified group of RATs to select.

In determination block 922, the device processor may determine whether there is a likelihood that the selected RAT will interfere with the first RAT, such as by performing a lookup in an interference data table as described (e.g., with reference to FIGS. 7-8). In response to determining that there is no likelihood of inter-RAT coexistence interference between the first RAT and the selected (i.e., determination block 922="No"), the device processor may acquire service with the first RAT and the selected RAT in block 910. As a result, the device processor may ensure that the first RAT's high-priority operations are not degraded while receiving services from the selected RAT, which has the highest priority among RATs in the identified group that do not interfere with the first RAT.

In response to determining that there is a likelihood that the selected RAT will interfere with the first RAT (i.e., determination block 922="Yes"), the device processor may determine whether there is a RAT in the identified group of RATs that has not been previously selected in determination block 924. In other words, the device processor may determine whether each member of the identified group RATs has already been selected and evaluated for its potential to interfere with the first RAT in determination block 922.

In response to determine that there is a RAT in the identified group of RATs that has not been previously selected (i.e., determination block 924="Yes"), the device processor may select a previously unselected RAT in the identified group of RATs that has a next highest priority in block 926. The device processor may repeat the above operations by again determining in determination block 922 whether there is a likelihood that the most recently selected RAT (i.e., in block 926) will interfere with the first RAT.

In response to determining that each RAT in the identified group has been previously selected (i.e., determination block 924="No"), at which point the processor will have determined that no other RATs will not interfere with the first RAT, the device processor may acquire service with the first RAT and the second RAT in block 908 and implement interference mitigation strategies for the first RAT and the second RAT in block 912. In some embodiments, the device processor may perform the operations in blocks 908, 912 as described with reference to the blocks 908, 912 of the method 612a. As such, the device processor may acquire service from a "preferred" combination of the first RAT and a second RAT in response to determining that the first RAT interferes with each member of the identified group of RATs.

The device processor may continue monitoring the first RAT for a frequency band/channel change in block 614 of the method 600, and may continue performing the operations of the method 600 as described.

Figure 9C:
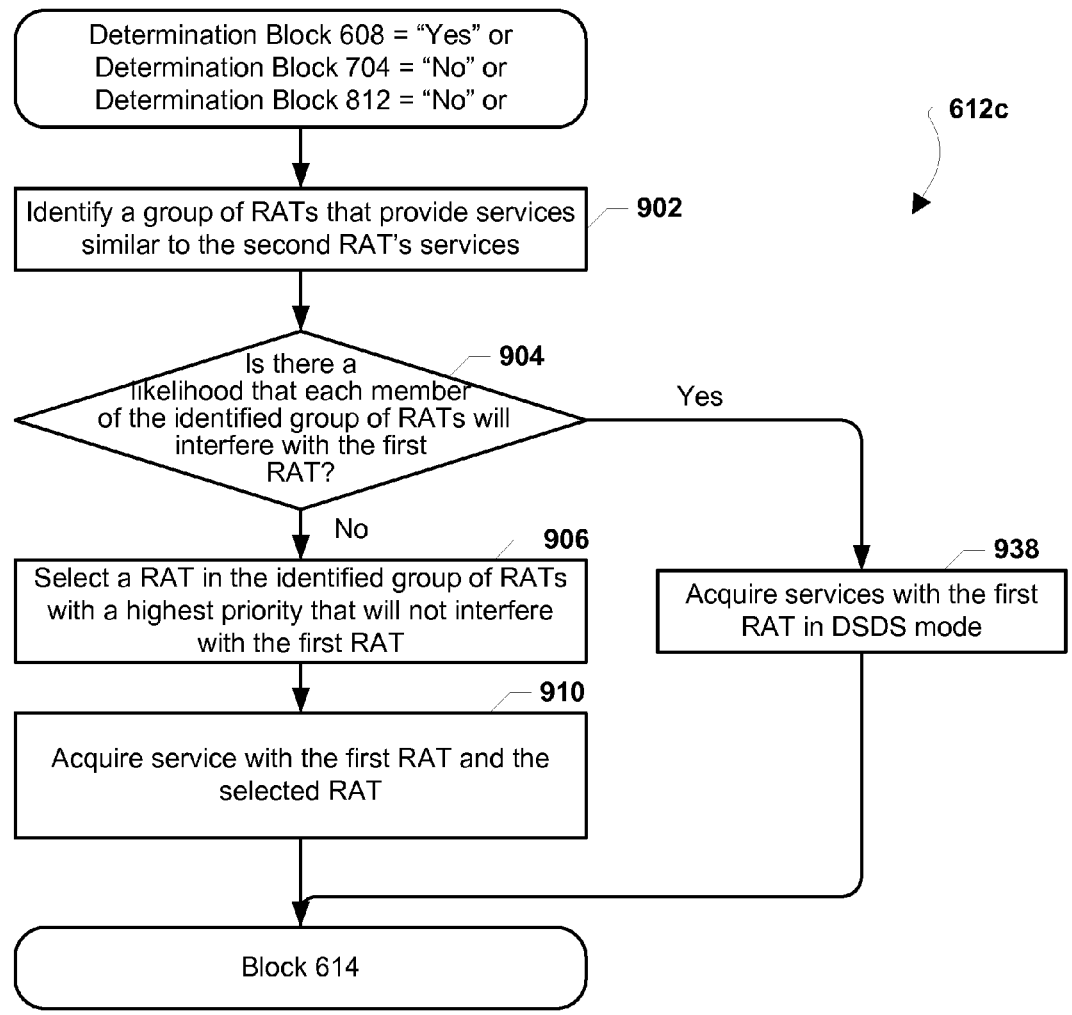

FIG. 9C illustrates an embodiment method 612c that may be implemented by a processor (e.g., the general processor 206 of FIG. 2, the baseband modem processor 216, the coexistence management unit 230, a separate controller, and/or the like) on a mobile communication device (e.g., the mobile communication device 200 of FIG. 2) for acquiring service with a first RAT and a third RAT, or entering a DSDS operating mode if necessary, to avoid inter-RAT coexistence interference between the first RAT and the second RAT. The operations of the method 612c implement some embodiments of the operations of block 612 of the method 600 described with reference to FIG. 6. Also, the method 612c is substantially the same as the method 612a described with reference to FIG. 9A, and therefore descriptions of like numbered blocks are omitted. With reference to FIGS. 1-9C, in response to determining that there is a likelihood that each member of the identified group of RATs will interfere with the first RAT (i.e., determination block 904="Yes"), the device processor may acquire service previously handled by or intended for the second RAT with the first RAT by operating in a dual-SIM dual-standby (DSDS) mode in block 938. In this manner, the potential for interference is eliminated by using the RAT sharing methods commonly implemented on DSDS mobile devices. Thereafter, the device processor may continue monitoring the first RAT for a frequency band/channel change in block 614 of the method 600, and may continue performing the operations of the method 600 as described.

Figure 9D:
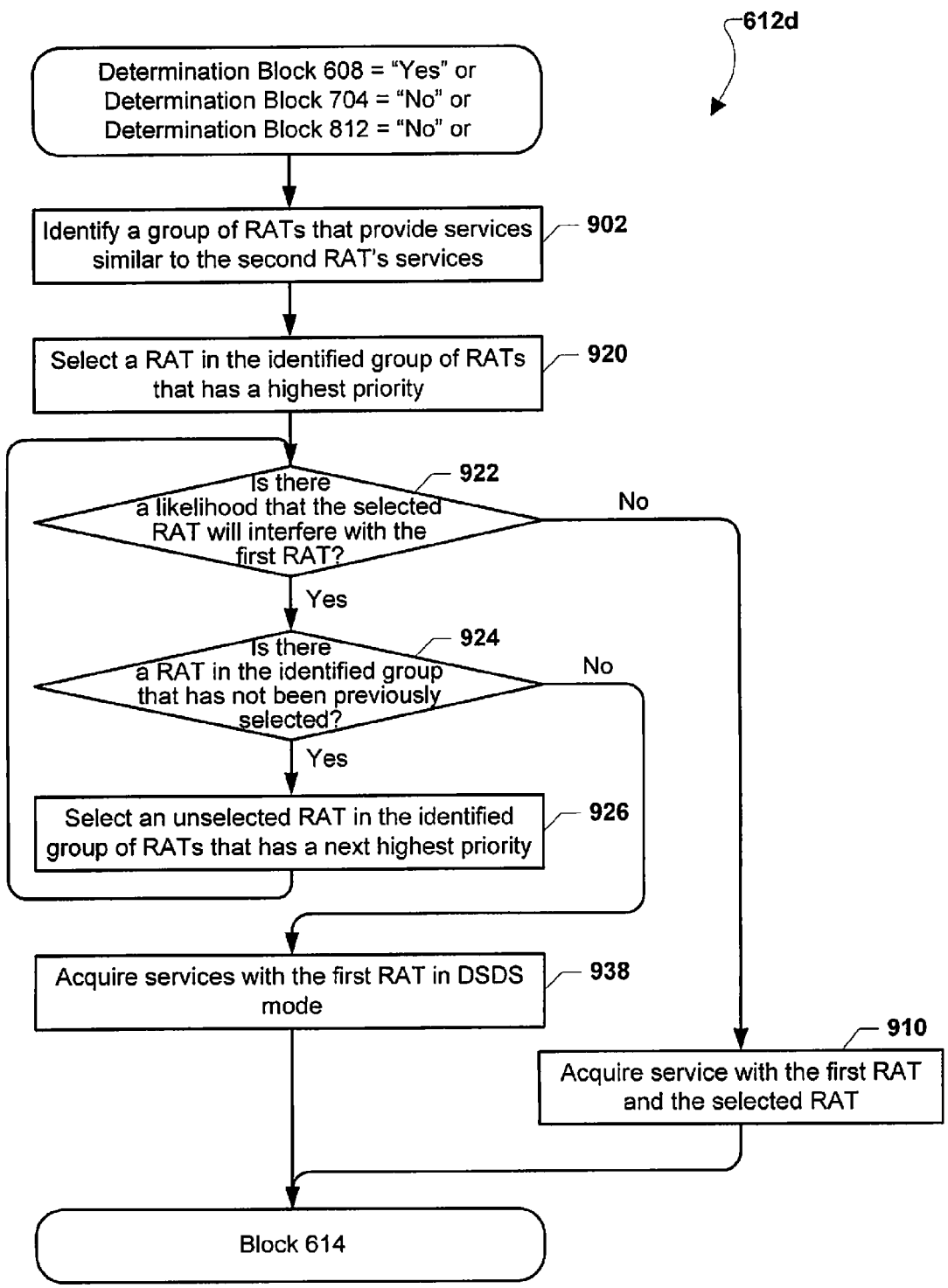

FIG. 9D illustrates an embodiment method 612d that may be implemented by a processor (e.g., the general processor 206 of FIG. 2, the baseband modem processor 216, the coexistence management unit 230, a separate controller, and/or the like) on a mobile communication device (e.g., the mobile communication device 200 of FIG. 2) for acquiring service with a first RAT and a third RAT, or entering a DSDS operating mode if necessary, to avoid inter-RAT coexistence interference between the first RAT and the second RAT. The operations of the method 612d implement some embodiments of the operations of block 612 of the method 600 described with reference to FIG. 6. Also, the method 612d is substantially the same as the method 612b described with reference to FIG. 9B, and therefore descriptions of like numbered blocks are omitted. With reference to FIGS. 1-9D, response to determining that each RAT in the identified group has been previously selected (i.e., determination block 924="No"), at which point the processor will have determined that no other RATs will not interfere with the first RAT, the device processor may acquire service previously handled by or intended for the second RAT with the first RAT by operating in a dual-SIM dual-standby (DSDS) mode in block 938. In this manner, the potential for interference is eliminated by using the RAT sharing methods commonly implemented on DSDS mobile devices. Thereafter, the device processor may continue monitoring the first RAT for a frequency band/channel change in block 614 of the method 600, and may continue performing the operations of the method 600 as described.

Figure 10A:
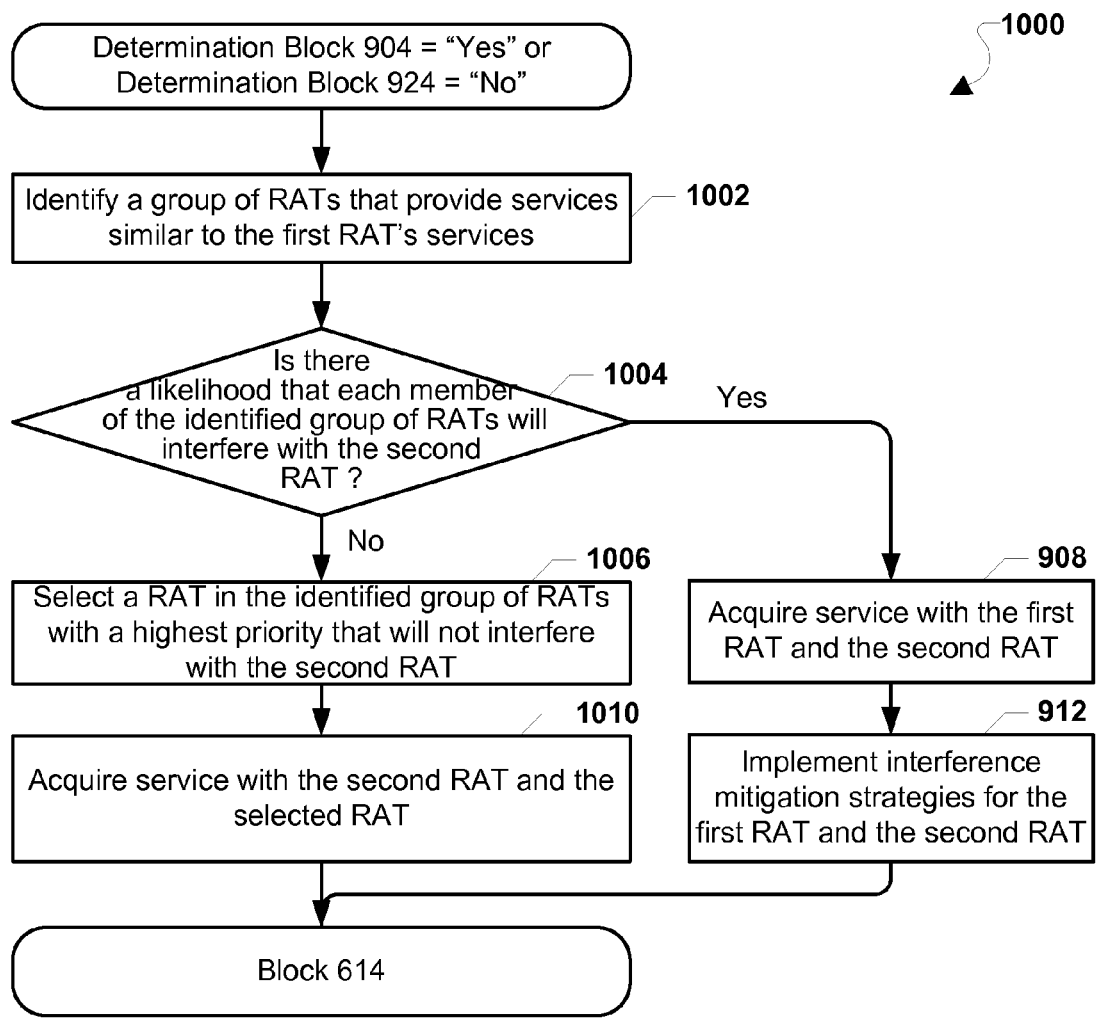
FIGS. 10A-10B are process flow diagrams illustrating methods for acquiring service with a second RAT and a third RAT in response to determining that there is a likelihood of coexistence interference occurring between a first RAT and other RATs on the mobile communication device according to various embodiments.

FIG. 10A illustrates an embodiment method 1000 that may be implemented by a processor (e.g., the general processor 206 of FIG. 2, the baseband modem processor 216, the coexistence management unit 230, a separate controller, and/or the like) on a mobile communication device (e.g., the mobile communication device 200 of FIG. 2) for acquiring service with a second RAT and a third RAT in response to determining that there is a likelihood of inter-RAT coexistence interference between a first RAT and other RATs on the mobile communication device. The operations of the method 1000 implement some embodiments of the operations of the methods 612a, 612b described with reference to FIGS. 9A-9B.

In some embodiments, when the device processor determines that there is a likelihood of inter-RAT coexistence interference between the first RAT and each other available RATs on the mobile communication device, the device processor may implement the method 1000 in an attempt to identify another combination of RATs that will avoid inter-RAT coexistence interference despite the first RAT's high priority. In other words, when the first RAT (i.e., the highest priority RAT) is unable to avoid inter-RAT coexistence interference, the device processor may determine whether the second RAT (i.e., the next highest priority RAT) is able to receive service at the same time as another RAT (i.e., other than the first RAT) while avoiding the possibility of inter-RAT coexistence interference.

With reference to FIGS. 1-10A, the device processor may begin performing the operations of the method 1000 in response to determining that there is a likelihood that the first RAT and each member of the identified group of RATs will interfere (i.e., determination block 904="Yes" in the method 612a). In some embodiments, the device processor may begin performing the operations of the method 1000 in response to determining that every RAT in the identified group has been selected (i.e., determination block 924="No" in the method 612b).

In block 1002, the device processor may identify a group of RATs that provide services similar to the first RAT services. As described (e.g., with reference to FIG. 9A), the device processor may attempt to find a substitute to replace the first RAT by identifying one or more RATs that are able to provide the same or similar services.

In determination block 1004, the device processor may determine whether there is a likelihood that each member of the identified group RATs will interfere with the second RAT, such as by performing look-up operations in an interference table for available frequency bands for each member of the identified group.

In response to determining that there is a likelihood that each member of the identified group RATs will interfere with the second RAT (i.e., determination block 1004="Yes"), the device processor may acquire service with the first RAT and second RAT in block 908, such as described with reference to block 908 of the methods 612a, 612b. In other words, when both the first and second RATs are likely to experience inter-RAT coexistence interference with the other RATs on the mobile communication device, the device processor may implement a "preferred" RAT configuration in which the first RAT and the second RAT (i.e., the two highest priority RATs) are configured to received service despite the likelihood that the first RAT and/or the second RAT will experience inter-RAT coexistence interference. Further, to address the likelihood of inter-RAT coexistence interference that may result by acquiring service with the first RAT and the second RAT in block 908, the device processor may implement interference mitigation strategies for the first RAT and the second RAT in block 912 as described with reference to block 912 of the methods 612a, 612b.

In response to determining that the second RAT and at least one member of the identified group of RATs are not likely to interfere with each other (i.e., determination block 1004="No"), the device processor may select a RAT in the identified group RATs with the highest priority that will not interfere with the second RAT in block 1006. In some embodiments, the operations performed in block 1006 may be similar to those operations performed in block 906 of the method 612a. For example, the device processor may select the RAT based on a look-up operation performed in an interference table that includes, among other things, the relative priorities of the RATs in the group identified in block 1002.

In block 1010, the device processor may acquire service with the second RAT and the RAT selected in block 1006. By selecting a RAT that will not interfere with the second RAT, the device processor may ensure that the performance of the second RAT will not be degraded due to inter-RAT coexistence interference.

The device processor may continue monitoring the first RAT for a frequency band/channel change in block 614 of the method 600, and may continue performing the operations of the method 600 as described.

Figure 10B:
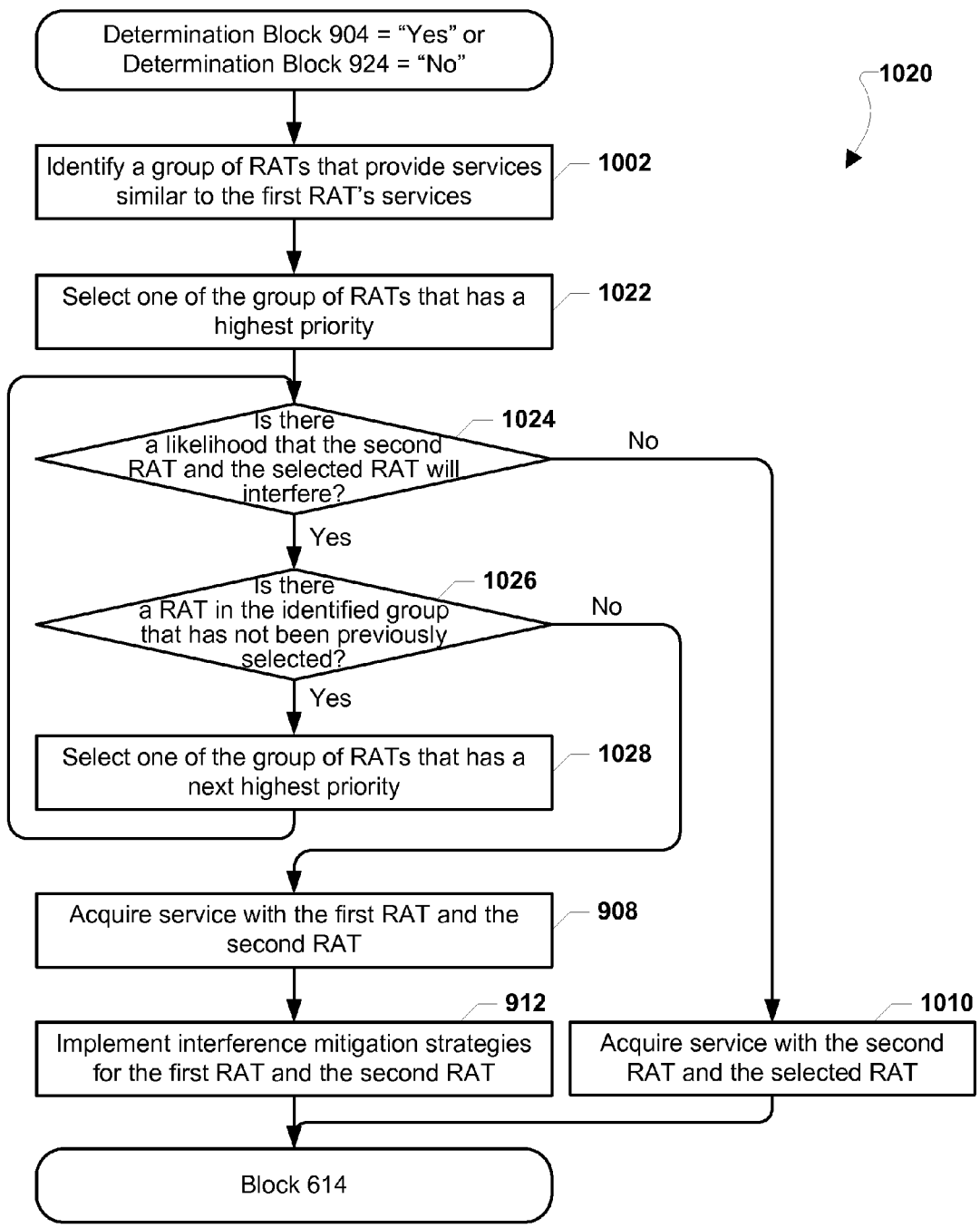

FIG. 10B illustrates an embodiment method 1020 that may be implemented by a processor (e.g., the general processor 206 of FIG. 2, the baseband modem processor 216, the coexistence management unit 230, a separate controller, and/or the like) on a mobile communication device (e.g., the mobile communication device 200 of FIG. 2) for acquiring service with the second RAT and a third RAT in response to determining that the first RAT may not receive service without experiencing inter-RAT coexistence interference. The operations of the method 1020 implement some embodiments of the operations of the methods 612a, 612b described with reference to FIGS. 9A-9B.

With reference to FIGS. 1-10B, the device processor may begin performing the operations of the method 1020 in response to determining that there is a likelihood that the first RAT and each member of a group of RATs identified in block 902 will interfere (i.e., determination block 904="Yes" in the method 612a). In some embodiments, the device processor may begin performing the operations of the method 1020 in response to determining that every RAT in the group identified in block 902 has been selected (i.e., determination block 924="No" in the method 612b).

In block 1002, the device processor may identify a group of RATs that provide services similar to the first RAT services, such as by performing operations similar to those described with reference to block 1002 of the method 1000.

In block 1022, the device processor may select one of the group RATs and has a highest priority. In some embodiments, the device processor may perform the operations in the block 1022 by referencing a table that includes priority information for each RAT in the group identified in block 1002.

In determination block 1024, the device processor may determine whether there is a likelihood that the selected RAT will interfere with the second RAT, such as by performing a lookup in an interference data table (e.g., as described with reference to determination block 922 of the method 612b). In response to determining that it is not likely that the selected RAT will interfere with the second RAT (i.e., determination block 1024="No"), the device processor may acquire service with the second RAT and the selected RAT in block 1010, such as by performing operations similar to those described with reference to block 1010 of the method 1000.

In response to determine that there is a likelihood that the selected RAT will interfere with the second RAT (i.e., determination block 1024="Yes"), the device processor may determine whether there is a RAT in the identified group of RATs that has not been previously selected in determination block 1026. In other words, the device processor may determine whether each member of the identified group of RATs has previously been determined as likely to interfere with the second RAT.

In response to determining that there is a RAT in the identified group of RATs that has not been previously selected (i.e., determination block 1026="Yes"), the device processor may select one of the identified group of RATs that has a next highest priority in block 1028. The device processor may continue by determining in determination block 1024 whether there is a likelihood that the RAT selected in block 1028 will interfere with the second RAT, and continue the above operations of the method 1020 as described until the device processor determines that it is not likely that a selected RAT will interfere with the second RAT (i.e., determination block 1024="No") or that each RAT in the identified group has already been selected (i.e., determination block 1026="No").

In response to determining that each RAT in the identified group has been previously selected (i.e., determination block 1026="No"), the device processor may acquire service with the first RAT and the second RAT in block 908 and implement interference mitigation strategies for the first RAT and the second RAT in block 912. In some embodiments, the device processor may perform the operations in blocks 908, 912 as described with reference to the blocks 908, 912 of the methods 612a, 612b. As such, the device processor may attempt to receive service from a "preferred" RAT combination that includes the first RAT and the second RAT in response to determining that the first RAT and second RAT are unable to avoid inter-RAT coexistence interference with other RATs on the mobile communication device.

The device processor may continue monitoring the first RAT for a frequency band/channel change in block 614 of the method 600, and may continue performing the operations of the method 600 as described.

Figure 11:
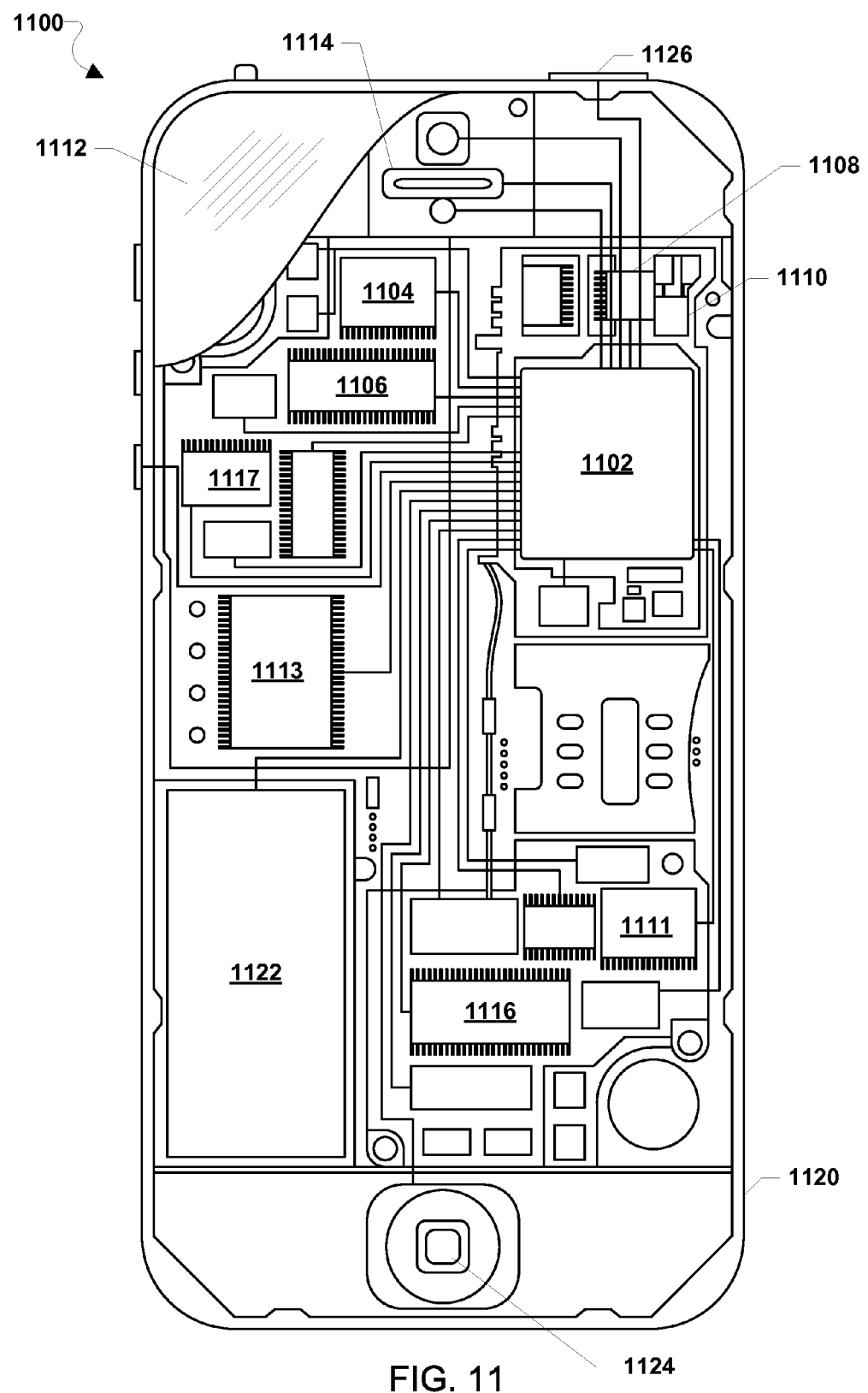
FIG. 11 is a component block diagram of a multi-active communication device suitable for implementing some embodiment methods.

Various embodiments may be implemented in any of a variety of mobile communication devices, an example on which (e.g., mobile communication device 1100) is illustrated in FIG. 11. According to various embodiments, the mobile communication device 1100 may be similar to the mobile communication devices 110, 120, 200 as described above with reference to FIGS. 1-4. As such, the mobile communication device 1100 may implement the methods 600, 612a, 612b, 700, 800, 1000, 1020 in FIGS. 6-10B.

Thus, with reference to FIGS. 1-10B, the mobile communication device 1100 may include a processor 1102 coupled to a touchscreen controller 1104 and an internal memory 1106. The processor 1102 may be one or more multi-core integrated circuits designated for general or specific processing tasks. The internal memory 1106 may be volatile or non-volatile memory, and may also be secure and/or encrypted memory, or unsecure and/or unencrypted memory, or any combination thereof. The touchscreen controller 1104 and the processor 1102 may also be coupled to a touchscreen panel 1112, such as a resistive-sensing touchscreen, capacitive-sensing touchscreen, infrared sensing touchscreen, etc. Additionally, the display of the mobile communication device 1100 need not have touch screen capability.

The mobile communication device 1100 may have one or more cellular network transceivers 1108, 1116 coupled to the processor 1102 and to two or more antennae 1110, 1111 and configured for sending and receiving cellular communications. The transceivers 1108, 1116 and the antennae 1110, 1111 may be used with the above-mentioned circuitry to implement the various embodiment methods. The mobile communication device 1100 may include one or more SIM cards (e.g., SIM 1113) coupled to the transceivers 1108, 1116 and/or the processor 1102 and configured as described above. The mobile communication device 1100 may include a cellular network wireless modem chip 1117 that enables communication via a cellular network and is coupled to the processor 1102.

The mobile communication device 1100 may also include speakers 1114 for providing audio outputs. The mobile communication device 1100 may also include a housing 1120, constructed of a plastic, metal, or a combination of materials, for containing all or some of the components discussed herein. The mobile communication device 1100 may include a power source 1122 coupled to the processor 1102, such as a disposable or rechargeable battery. The rechargeable battery may also be coupled to the peripheral device connection port to receive a charging current from a source external to the mobile communication device 1100. The mobile communication device 1100 may also include a physical button 1124 for receiving user inputs. The mobile communication device 1100 may also include a power button 1126 for turning the mobile communication device 1100 on and off.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for avoiding coexistence interference between radio access technologies (RATs) operating on a mobile communication device, comprising:
   determining whether there is a likelihood of coexistence interference occurring between a first RAT and a second RAT;
   acquiring service with the first RAT and the second RAT in response to determining that there is not a likelihood of coexistence interference occurring between the first RAT and the second RAT;
   acquiring service with the first RAT and a third RAT that will not interfere with the first RAT in response to determining that there is a likelihood of coexistence interference occurring between the first RAT and the second RAT;
   determining whether there is no longer a likelihood of coexistence interference occurring between the first RAT and the second RAT; and
   acquiring service with the first RAT and the second RAT in response to determining that there is no longer a likelihood of coexistence interference occurring between the first RAT and the second RAT.

2. The method of claim 1, wherein the first RAT has a highest priority of a plurality of RATs on the mobile communication device and the second RAT has a next highest priority of the plurality of RATs.

3. The method of claim 1, wherein:
   determining whether there is a likelihood of coexistence interference occurring between a first RAT and a second RAT comprises determining whether there is a combination of frequency bands for the first RAT and the second RAT that will avoid coexistence interference between the first RAT and the second RAT; and acquiring service with the first RAT and the second RAT in response to determining that there is not a likelihood of coexistence interference occurring between the first RAT and the second RAT comprises acquiring service with the first RAT and the second RAT based on the combination of frequency bands in response to determining that the combination of frequency bands will avoid coexistence interference between the first RAT and the second RAT.

4. The method of claim 1, further comprising:
monitoring the first RAT and the second RAT for frequency band changes in response to acquiring service with the first RAT and the second RAT;
determining whether coexistence-interference conditions between the first RAT and the second RAT have changed; and
determining whether there is now a likelihood of coexistence interference occurring between the first RAT and the second RAT in response to determining that coexistence-interference conditions between the first RAT and the second RAT have changed.

5. The method of claim 1, wherein determining whether there is a likelihood of coexistence interference occurring between a first RAT and a second RAT comprises:
performing a lookup in an interference data table for frequency bands available to the first RAT and frequency bands available to the second RAT; and
determining whether there is a likelihood of coexistence interference occurring between the first RAT and the second RAT based on the table lookup.

6. The method of claim 1, wherein
determining whether there is no longer a likelihood of coexistence interference occurring between the first RAT and the second RAT is performed in response to acquiring service with the first RAT and the third RAT.

7. The method of claim 6, wherein determining whether there is no longer a likelihood of coexistence interference occurring between the first RAT and the second RAT comprises:
monitoring the first RAT for frequency band changes;
performing background frequency band scans for the second RAT to determine whether new frequency bands are available to the second RAT;
determining whether coexistence-interference conditions between the first RAT and the second RAT have changed; and
determining whether there is no longer a likelihood of coexistence interference occurring between the first RAT and the second RAT in response to determining that coexistence-interference conditions between the first RAT and the second RAT have changed.

8. The method of claim 1, wherein:
determining whether there is a likelihood of coexistence interference occurring between a first RAT and a second RAT comprises:
identifying a preferred frequency band of the first RAT and a preferred frequency band of the second RAT; and
determining whether there is a likelihood that the preferred frequency band of the first RAT and the preferred frequency band of the second RAT will interfere; and
acquiring service with the first RAT and the second RAT comprises acquiring service with the first RAT via the preferred frequency band of the first RAT and with the second RAT via the preferred frequency band of the second RAT in response to determining that there is not a likelihood that the preferred frequency band of the first RAT and the preferred frequency band of the second RAT will interfere.

9. The method of claim 8, wherein determining whether there is a likelihood that the preferred frequency band of the first RAT and the preferred frequency band of the second RAT will interfere comprises:
performing a lookup in an interference data table for the preferred frequency band of the first RAT and the preferred frequency band of the second RAT; and
determining whether there is a likelihood that the preferred frequency band of the first RAT and the preferred frequency band of the second RAT will interfere based on the table lookup.

10. The method of claim 8, wherein:
determining whether there is a likelihood of coexistence interference occurring between a first RAT and a second RAT further comprises determining whether there is a frequency band available to the second RAT that will not interfere with the preferred frequency band of the first RAT in response to determining that there is a likelihood that the preferred frequency band of the first RAT and the preferred frequency band of the second RAT will interfere; and
acquiring service with the first RAT and the second RAT further comprises acquiring service with the first RAT via the preferred frequency band of the first RAT and with the second RAT via a frequency band available to the second RAT that will not interfere with the preferred frequency band of the first RAT in response to determining that there is a frequency band available to the second RAT that will not interfere with the preferred frequency band of the first RAT.

11. The method of claim 10, wherein determining whether there is a frequency band available to the second RAT that will not interfere with the preferred frequency band of the first RAT comprises:
performing a lookup in an interference data table for the preferred frequency band for the first RAT and each frequency band available to the second RAT; and
determining whether there is a frequency band available to the second RAT that will not interfere with the preferred frequency band of the first RAT based on the table lookup.

12. The method of claim 1, wherein acquiring service with the first RAT and a third RAT that will not interfere with the first RAT comprises:
identifying a first group of RATs that provide services similar to services of the second RAT;
determining whether there is a RAT within the first group of RATs for which there is not a likelihood of interfering with the first RAT;
selecting a RAT in the first group of RATs that has a highest priority within the first group of RATs and that will not interfere with the first RAT in response to determining that there is a RAT within the first group of RATs for which there is not a likelihood of interfering with the first RAT; and
acquiring service with the first RAT and the selected RAT.

13. The method of claim 12, further comprising:
acquiring service with the first RAT and the second RAT and implementing coexistence interference mitigation strategies for the first RAT and the second RAT in response to determining that there is no RAT within the first group of RATs for which there is not a likelihood of interfering with the first RAT.

14. The method of claim 12, further comprising:
identifying a second group of RATs that provide services similar to services of the first RAT in response to determining that there is no RAT within the first group of RATs for which there is not a likelihood of interfering with the first RAT;
determining whether there is a RAT within the second group of RATs for which there is not a likelihood of interfering with the second RAT;
selecting a RAT in the second group of RATs that has a highest priority within the second group of RATs and that will not interfere with the second RAT in response to determining that there is a RAT within the second group of RATs for which there is not a likelihood of interfering with the second RAT; and
acquiring service with the second RAT and the selected RAT.

15. The method of claim 14, further comprising:
acquiring service with the first RAT and the second RAT and implementing coexistence interference mitigation strategies for the first RAT and the second RAT in response to determining that there is no RAT within the second group of RATs for which there is not a likelihood of interfering with the second RAT.

16. The method of claim 14, further comprising:
acquiring services intended for the first RAT and the second RAT using the first RAT operating in a dual-SIM dual standby operating mode in response to determining that there is no RAT within the second group of RATs for which there is not a likelihood of interfering with the second RAT.

17. The method of claim 12, further comprising:
identifying a second group of RATs that provide services similar to services of the first RAT in response to determining that there is no RAT within the first group of RATs for which there is not a likelihood of interfering with the first RAT;
selecting a RAT in the second group of RATs that has a highest priority within the second group of RATs;
determining whether there is a likelihood that the selected RAT will interfere with the second RAT; and
acquiring service with the second RAT and the selected RAT in response to determining that there is not a likelihood that the selected RAT will interfere with the second RAT.

18. The method of claim 17, further comprising:
determining whether there is a RAT in the second group of RATs that has not been selected in response to determining that there is a likelihood that the selected RAT will interfere with the second RAT; and
acquiring services intended for the first RAT and the second RAT using the first RAT operating in a dual-SIM dual standby operating mode in response to determining that each RAT in the second group of RATs has been selected.

19. The method of claim 17, further comprising:
determining whether there is a RAT in the second group of RATs that has not been selected in response to determining that there is a likelihood that the selected RAT will interfere with the second RAT; and
acquiring service with the first RAT and the second RAT and implementing coexistence interference mitigation strategies for the first RAT and the second RAT in response to determining that each RAT in the second group of RATs has been selected.

20. The method of claim 19, further comprising:
selecting an unselected RAT in the second group of RATs that has a next highest priority in the second group of RATs in response to determining that there is a RAT in the second group of RATs that has not previously been selected;
determining whether there is a likelihood that the selected RAT that has the next highest priority in the second group of RATs will interfere with the second RAT; and
acquiring service with the second RAT and the selected RAT that has the next highest priority in the second group of RATs in response to determining that there is not a likelihood that the selected RAT with the next highest priority in the second group of RATs will interfere with the second RAT.

21. The method of claim 1, wherein acquiring service with the first RAT and a third RAT that will not interfere with the first RAT comprises:
identifying a first group of RATs that provide services similar to services of the second RAT;
selecting a RAT in the first group of RATs that has a highest priority within the first group of RATs;
determining whether there is a likelihood that the selected RAT will interfere with the first RAT; and
acquiring service with the first RAT and the selected RAT in response to determining that there is not a likelihood that the selected RAT will interfere with the first RAT.

22. The method of claim 21, further comprising:
determining whether there is a RAT in the first group of RATs that has not been selected in response to determining that there is a likelihood that the selected RAT will interfere with the first RAT; and
acquiring services intended for the first RAT and the second RAT using the first RAT operating in a dual-SIM dual standby operating mode in response to determining that each RAT in the first group of RATs has been selected.

23. The method of claim 21, further comprising:
determining whether there is a RAT in the first group of RATs that has not been selected in response to determining that there is a likelihood that the selected RAT will interfere with the first RAT; and
acquiring service with the first RAT and the second RAT and implementing coexistence interference mitigation strategies for the first RAT and the second RAT in response to determining that each RAT in the first group of RATs has been selected.

24. The method of claim 23, further comprising:
selecting an unselected RAT in the first group of RATs that has a next highest priority in the first group of RATs in response to determining that there is a RAT in the first group of RATs that has not been selected;
determining whether there is a likelihood that the selected RAT that has the next highest priority in the first group of RATs will interfere with the first RAT; and
acquiring service with the first RAT and the selected RAT that has the next highest priority in the first group of RATs in response to determining that there is not a likelihood that the selected RAT that has the next highest priority in the first group of RATs will interfere with the first RAT.

25. A mobile communication device, comprising:
a memory; and
a processor coupled to the memory, wherein the processor is configured to:

determine whether there is a likelihood of coexistence interference occurring between a first radio access technology (RAT) and a second RAT;

acquire service with the first RAT and the second RAT in response to determining that there is not a likelihood of coexistence interference occurring between the first RAT and the second RAT;

acquire service with the first RAT and a third RAT that will not interfere with the first RAT in response to determining that there is a likelihood of coexistence interference occurring between the first RAT and the second RAT;

determine whether there is no longer a likelihood of coexistence interference occurring between the first RAT and the second RAT; and acquire service with the first RAT and the second RAT in response to determining that there is no longer a likelihood of coexistence interference occurring between the first RAT and the second RAT.

26. The mobile communication device of claim 25, wherein the processor is configured
such that the operation of determining whether there is no longer a likelihood of coexistence interference occurring between the first RAT and the second RAT is performed in response to acquiring service with the first RAT and the third RAT.

27. The mobile communication device of claim 25, wherein the first RAT has a highest priority of a plurality of RATs on the mobile communication device and the second RAT has a next highest priority of the plurality of RATs.

28. The mobile communication device of claim 25, wherein the processor is further configured to:
determine whether there is a combination of frequency bands for the first RAT and the second RAT that will avoid coexistence interference between the first RAT and the second RAT; and
acquire service with the first RAT and the second RAT based on the combination of frequency bands in response to determining that the combination of frequency bands will avoid coexistence interference between the first RAT and the second RAT.

29. A non-transitory processor-readable storage medium having stored thereon processor-executable instructions configured to cause a processor of a mobile communication device to perform operations comprising:
determining whether there is a likelihood of coexistence interference occurring between a first radio access technology (RAT) and a second RAT;
acquiring service with the first RAT and the second RAT in response to determining that there is not a likelihood of coexistence interference occurring between the first RAT and the second RAT;
acquiring service with the first RAT and a third RAT that will not interfere with the first RAT in response to determining that there is a likelihood of coexistence interference occurring between the first RAT and the second RAT;
determining whether there is no longer a likelihood of coexistence interference occurring between the first RAT and the second RAT; and
acquiring service with the first RAT and the second RAT in response to determining that there is no longer a likelihood of coexistence interference occurring between the first RAT and the second RAT.

30. A mobile communication device, comprising:
means for determining whether there is a likelihood of coexistence interference occurring between a first radio access technology (RAT) and a second RAT;
means for acquiring service with the first RAT and the second RAT in response to determining that there is not a likelihood of coexistence interference occurring between the first RAT and the second RAT;
means for acquiring service with the first RAT and a third RAT that will not interfere with the first RAT in response to determining that there is a likelihood of coexistence interference occurring between the first RAT and the second RAT;
means for determining whether there is no longer a likelihood of coexistence interference occurring between the first RAT and the second RAT; and
means for acquiring service with the first RAT and the second RAT in response to determining that there is no longer a likelihood of coexistence interference occurring between the first RAT and the second RAT.

* * * * *